(12) United States Patent
Adelman et al.

(10) Patent No.: US 12,086,595 B2
(45) Date of Patent: Sep. 10, 2024

(54) APPARATUSES, METHODS, AND SYSTEMS FOR INSTRUCTIONS FOR DOWNCONVERTING A TILE ROW AND INTERLEAVING WITH A REGISTER

(71) Applicant: Intel Corporation, Santa Clara, CA (US)

(72) Inventors: Menachem Adelman, Haifa (IL); Robert Valentine, Kiryat Tivon (IL); Amit Gradstein, Binyamina (IL); Daniel Towner, Bath (GB); Mark Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 17/214,853

(22) Filed: Mar. 27, 2021

(65) Prior Publication Data

US 2022/0308873 A1    Sep. 29, 2022

(51) Int. Cl.
*G06F 9/30*    (2018.01)

(52) U.S. Cl.
CPC ........ *G06F 9/3016* (2013.01); *G06F 9/30025* (2013.01); *G06F 9/30098* (2013.01)

(58) Field of Classification Search
None
See application file for complete search history.

(56) References Cited

U.S. PATENT DOCUMENTS

| 6,629,115 B1* | 9/2003 | Rossignol ............... G06F 5/015 |
| | | 712/300 |
| 2003/0172254 A1* | 9/2003 | Mandavilli ........... G06F 7/5324 |
| | | 712/E9.034 |
| 2012/0254592 A1 | 10/2012 | San et al. |

(Continued)

FOREIGN PATENT DOCUMENTS

KR    10-2019-0090817 A    8/2019

OTHER PUBLICATIONS

Lam, Michael. O. et. al., Automatically Adapting Programs for Mixed-Precision Floating-Point Computation, 2013, ACM, pp. 369-378. (Year: 2013).*

(Continued)

*Primary Examiner* — Eric Coleman
(74) *Attorney, Agent, or Firm* — NICHOLSON DE VOS WEBSTER & ELLIOTT LLP

(57) ABSTRACT

Systems, methods, and apparatuses relating to interleaving data values. An embodiment includes decoding circuitry to decode a single instruction, the instruction having one or more fields to specify an opcode, one or more fields to specify a location of a first source operand, one or more fields to specify a location of a second source operand, one or more fields to specify a location of a destination operand, and one or more fields to specify an index value to be used to index a row in the first source operand, wherein the opcode is to indicate execution circuitry is to downconvert data elements of the indexed row of the first source operand, interleave the downconverted elements with data elements (Continued)

of the second source operand, and store the interleaved elements in the destination operand; and execution circuitry to execute the decoded instruction according to the opcode.

14 Claims, 36 Drawing Sheets

(56) References Cited

U.S. PATENT DOCUMENTS

| | | | |
|---|---|---|---|
| 2014/0208080 A1* | 7/2014 | Ould-Ahmed-Vall | ............................ G06F 9/3001 712/226 |
| 2015/0378741 A1* | 12/2015 | Lukyanov | ........... G06F 9/30018 712/226 |
| 2017/0083317 A1 | 3/2017 | Ould-Ahmed-Vall et al. | |
| 2019/0205137 A1 | 7/2019 | Meadows et al. | |
| 2019/0220278 A1* | 7/2019 | Adelman | ............ G06F 9/30025 |
| 2020/0210199 A1 | 7/2020 | Ould-Ahmed-Vall | |

OTHER PUBLICATIONS

Das, Dipankar et al., Mixed Precision Training of Convolutional Neural Networks using Integer Operations. 2018, arXiv: 1802.00930v2, 11 pages. (Year: 2018).*

International Search Report and Written Opinion, PCT App. No. PCT/US22/22040, Jul. 15, 2022, 8 pages.

International Preliminary Report on Patentability, PCT App. No. PCT/US22/22040, Oct. 12, 2023, 5 pages.

\* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

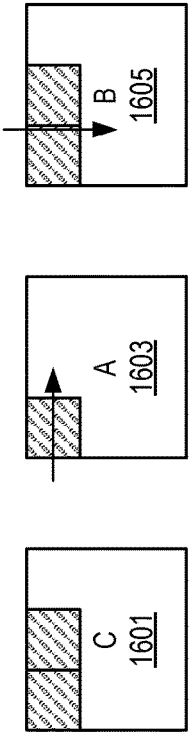

TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE

FIG. 16

| PALETTE ID 1901 | STARTM 1903 |
|---|---|
| STARTP 1905 | PAIR INDICATORS 1907 |
| 0 | 0 |
| 0 | 0 |

. . .

| 0 | 0 |
|---|---|
| TMM0 ROWS 1913 | TMM0 COLUMNS 1915 |
| TMM1 ROWS | TMM1 COLUMNS |
| ■ ■ ■ | |
| TMM15 ROWS | TMM15 COLUMNS |
| 0 | |

FIG. 19

```
TCVTROWPS2PHIE zsrcdest, tsrc, r32
row_index := r32
#GP if row_index > tsrc.rows
// odd elements of zsrcdest are preserved from input
for i in 0 ... palette_table[palette_id].bytes_per_row/4:
    zsrcdest.fp16[2*i+0] := zsrcdest.fp16[2*i+1]
    zsrcdest.fp16[2*i+1] := CONVERT_FP32_TO_FP16(tsrc.row[row_index].fp32[i], RNE)
zdest[MAX_VL-1:512] := 0
```

```
TCVTROWPS2PHIE zdest, zsrc, tsrc, imm8
row_index := imm8
#GP if row_index > tsrc.rows
for i in 0 ... palette_table[palette_id].bytes_per_row/4:
    zdest.fp16[2*i+0] := zsrc.fp16[2*i+1]
    zdest.fp16[2*i+1] := CONVERT_FP32_TO_FP16(tsrc.row[row_index].fp32[i], RNE)
zdest[MAX_VL-1:512] := 0
```

FIG. 25

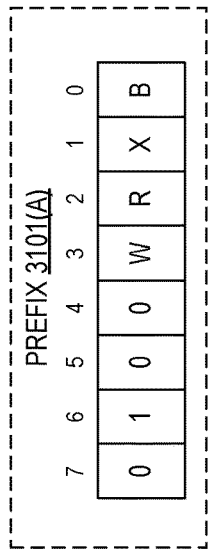
FIG. 33
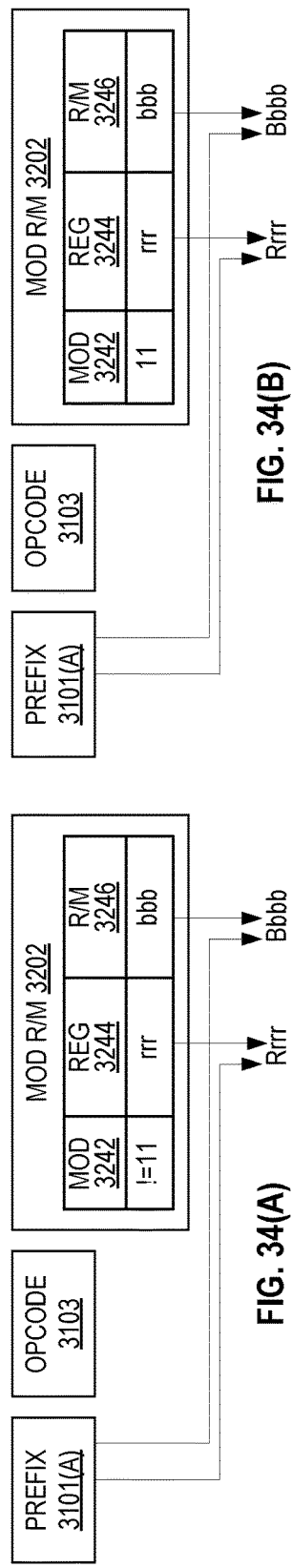
FIG. 34(A)
FIG. 34(B)
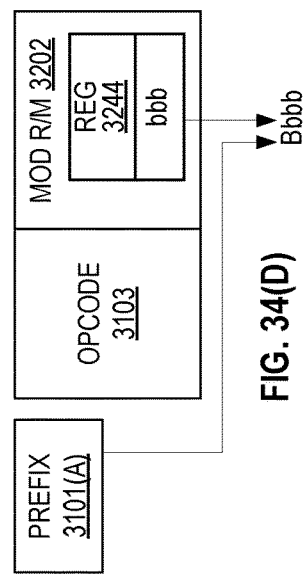
FIG. 34(D)
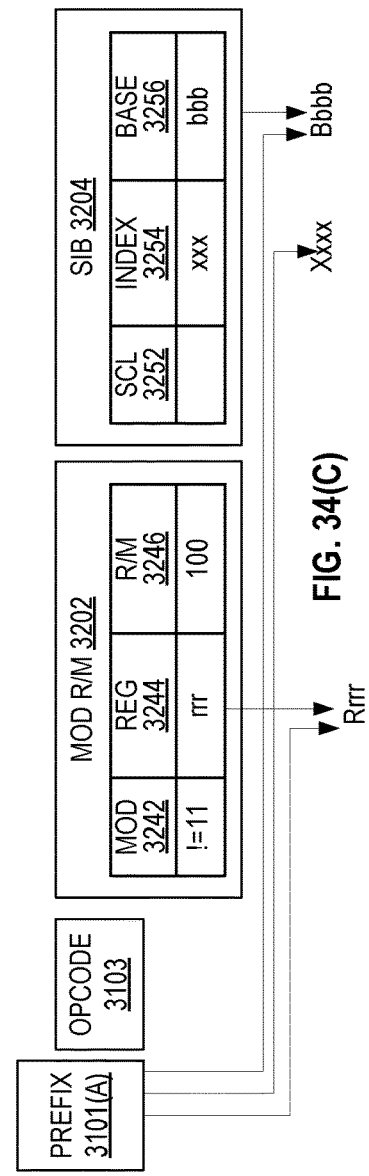
FIG. 34(C)

1

APPARATUSES, METHODS, AND SYSTEMS FOR INSTRUCTIONS FOR DOWNCONVERTING A TILE ROW AND INTERLEAVING WITH A REGISTER

TECHNICAL FIELD

The disclosure relates generally to computer processor architecture, and, more specifically, to systems and methods for matrix operations.

Matrices are increasingly important in many computing tasks such as machine learning and other bulk data processing. Deep Learning is a class of machine learning algorithms. Deep learning architectures, such as deep neural networks, have been applied to fields including computer vision, speech recognition, natural language processing, audio recognition, social network filtering, machine translation, bioinformatics and drug design.

Inference and training, two tools used for deep learning, are tending towards low precision arithmetic. Maximizing throughput of deep learning algorithms and computations may assist in meeting the needs of deep learning processors, for example, those performing deep learning in a data center.

Matrix-matrix multiplication (a.k.a., GEMM or General Matrix Multiplication) is a common compute-heavy operation on modern processors. Special hardware for matrix multiplication (e.g., GEMM) is a good option for improving the peak compute (and energy efficiency) of certain applications, such as deep learning.

Some of these applications, including deep learning, can operate on input data elements with relatively few bits without losing accuracy, as long as the output elements have enough bits (i.e., more than the inputs).

BRIEF DESCRIPTION OF THE DRAWINGS

The present disclosure is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment;

FIG. 15 illustrates an example of a matrix expressed in row major format and column major format;

FIG. 16 illustrates an example of usage of matrices (tiles);

FIG. 19 illustrates an embodiment of a description of the matrices (tiles) to be supported;

FIG. 25 illustrates examples of pseudo code for the execution of the TCVTROWPS2PHIE instruction.

FIG. 33 illustrates embodiments of a first prefix 3101(A).

FIGS. 34(A)-(D) illustrate embodiments of how the R, X, and B fields of the first prefix 3101(A) are used.

DETAILED DESCRIPTION

Figure 1A:
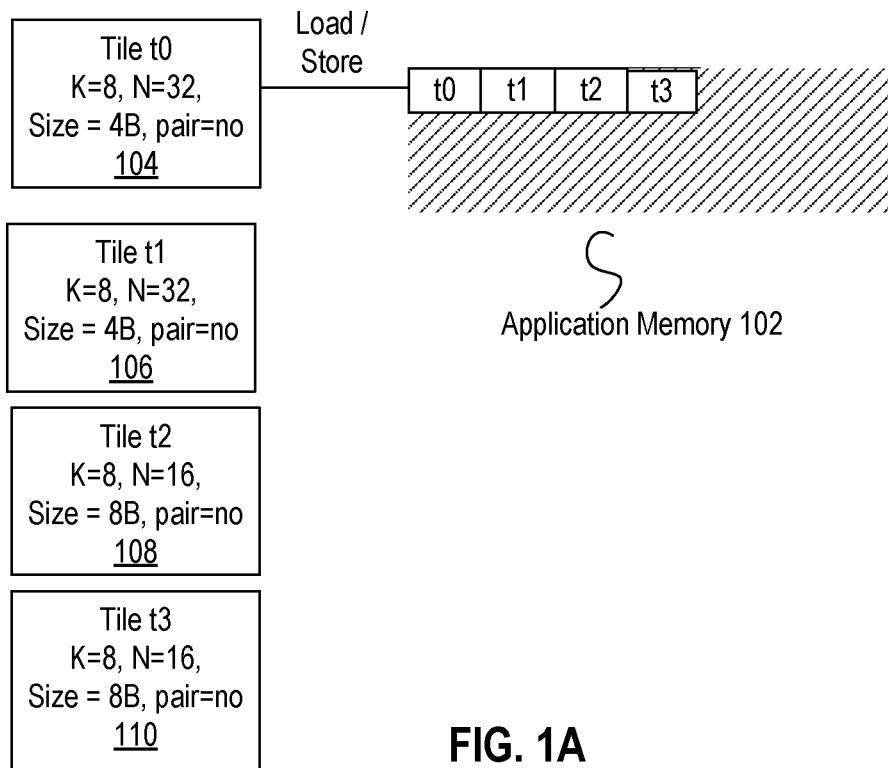
FIG. 1A illustrates an embodiment of configured tiles.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

Interleaved Institute for Electrical and Electronics Engineers (IEEE) half-precision floating point (FP16) FP16 pairs are fundamental to 5G workloads and other usages of matrix support for complex numbers. In some embodiments, matrix instructions for complex datatypes output tiles in IEEE single-precision floating point (FP32). Detailed herein are instructions that allow to create the interleaved less precision format seamlessly and without performance overheads. Note that in some embodiments, other downconverted floating point formats may be used such as bfloat16, FP8, FP4, INT8, INT16, INT4, etc.

DISCUSSION

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile) or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transform, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating-point, double precision floating-point, integer, etc.) may be supported.

Exemplary Usage of Configured Tiles

In some embodiments, tile parameters can be configured. For example, a given tile may be configured to provide tile options. Exemplary tile options include but are not limited to: a number of rows of the tile, a number of columns of the tile, whether the tile is VALID, and/or whether the tile consists of a PAIR of equal-sized tiles.

FIG. 1A illustrates an embodiment of configured tiles. As shown, 4 kB of application memory 102 have stored thereon 4 1 kB titles, tile t0 104, tile t1 106, tile t2 108, and tile t3 110. In this example, the 4 tiles do not consist of pairs, and each have elements arranged in rows and columns. Tile t0 104 and tile t1 106 have K rows and N columns of 4-byte elements (e.g., single precision data), where K equals 8 and N=32. Tile t2 108 and tile t3 110 have K rows and N/2 columns of 8-byte elements (e.g., double precision data). As the double precision operands are twice the width of single precision, this configuration is consistent with a palette, used to provide tile options, supplying at least 4 names with total storage of at least 4 kB. In operation, the tiles can be loaded from and stored to memory using load and store operations. Depending upon the instruction encoding scheme used, the amount of available application memory, as well as the size, number, and configuration of available tiles varies.

Figure 1B:
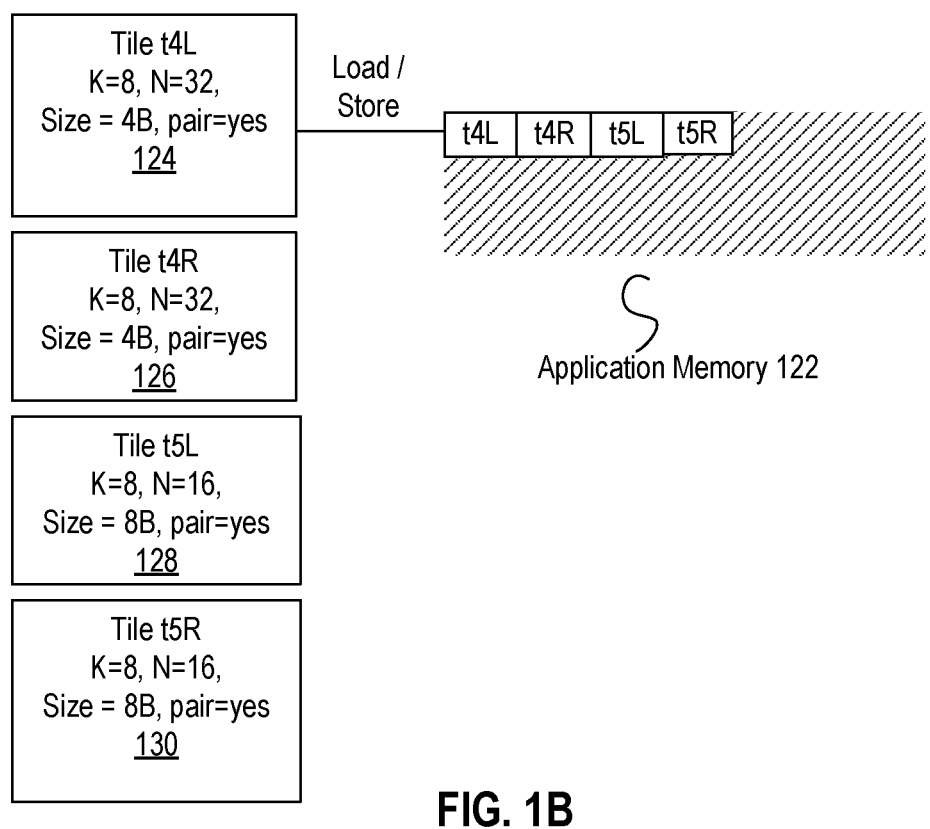
FIG. 1B illustrates an embodiment of configured tiles.

FIG. 1B illustrates an embodiment of configured tiles. As shown, 4 kB of application memory 122 have stored thereon 2 pairs of 1 kB-titles, the first pair being tile t4L 124 and tile t4R 126, and the second pair being tile t5L 128 and tile t5R 130. As shown the pairs of tiles are divided into a left tile and a right tile. In other embodiments, the pair of tiles are divided into an even tile and an odd tile. In this example, the 4 tiles each have elements arranged in rows and columns. Tile t4L 124 and tile t4R 126 have K rows and N columns of 4-byte elements (e.g., single precision floating-point data), where K equals 8 and N equals 32. Tile t5L 128 and tile t5R 130 have K rows and N/2 columns of 8-byte elements (e.g., double precision floating-point data). As the double precision operands are twice the width of single precision, this configuration is consistent with a palette, used to provide tile options, supplying at least 2 names with total storage of at least 4 kB. The four tiles of FIG. 1A use 4 names, each naming a 1 kB tile, whereas the 2 pairs of tiles in FIG. 1B can use 2 names to identify the paired tiles. In some embodiments, tile instructions accept a name of a paired tile as an operand. In operation, the tiles can be loaded from and stored to memory using load and store operations. Depending upon the instruction encoding scheme used, the amount of available application memory, as well as the size, number, and configuration of available tiles varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row).

As such, an application can be written such that a fixed usage of names will be able to take advantage of different storage sizes across implementations.

Configuration of tiles is done using a matrix (tile) configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Exemplary Tile Storage Types

Figure 2:
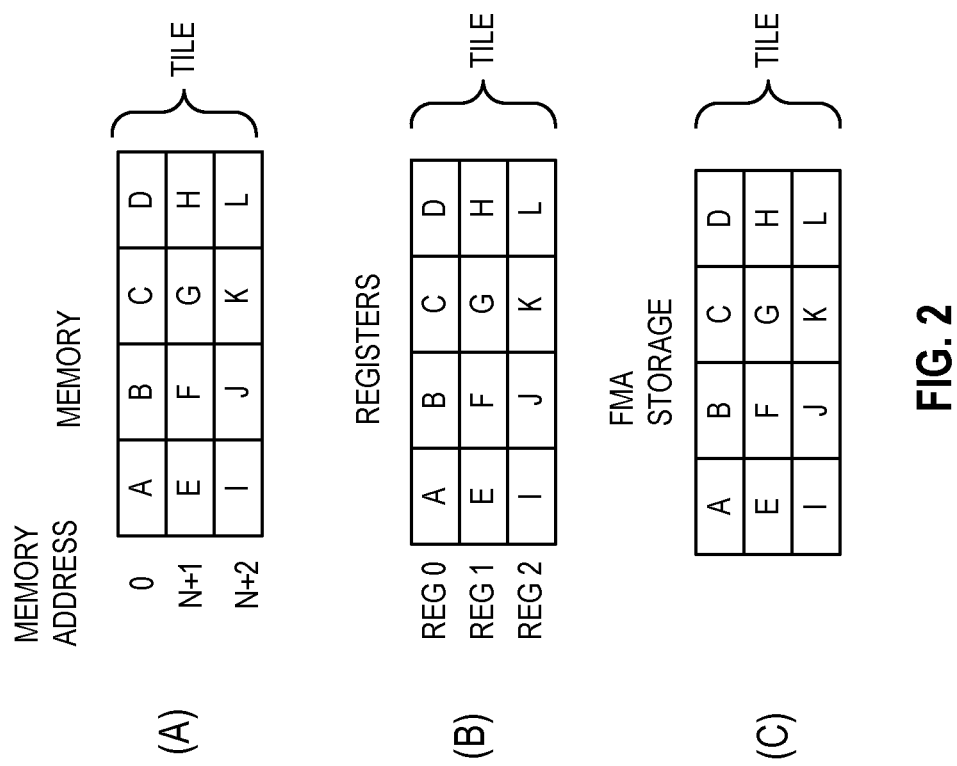
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allow for access of one row to then next when the tile storage does not map the underlying memory array row width.

Tile loads from memory and stores to memory are typically strided accesses from the application memory to packed rows of data. Exemplary TILELOAD and TILE-STORE instructions, or other instruction references to application memory as a TILE operand in load-op instructions, are, in some embodiments, restartable to handle (up to) 2*rows of page faults, unmasked floating-point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiply accumulate (FMA) circuit used in tile operations. This storage may be inside of an FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires identifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILE-CONFIG metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERE-LEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore instruction (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data into the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating-point operations also allow for unmasked floating-point exceptions, with the masking of the exceptions controlled by a control and/or status register.

To support restarting instructions after these events, the instructions store information in the start registers detailed below.

Matrix (Tile) Operation Systems

Exemplary Hardware Support

Figure 3:
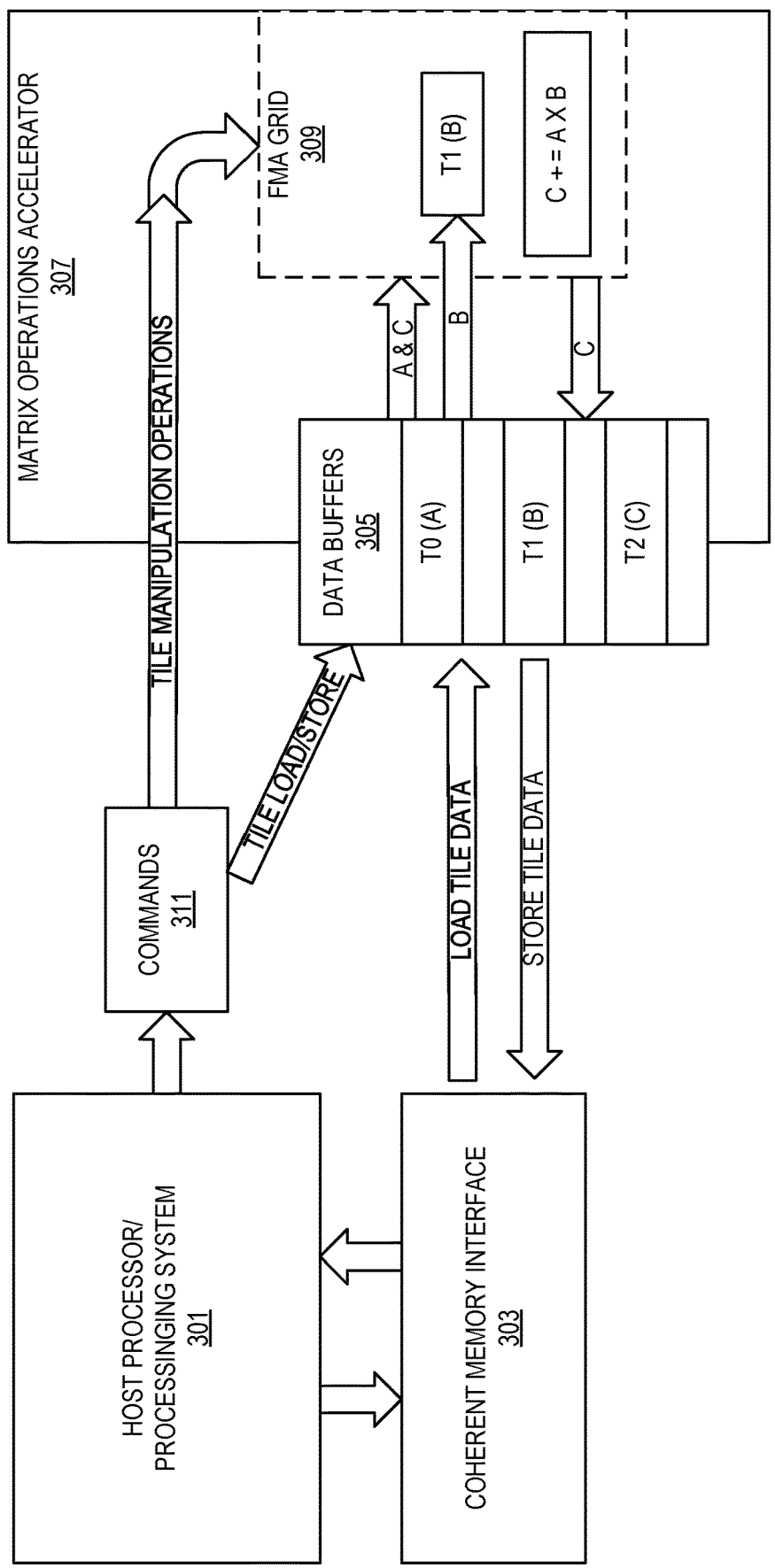
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macroinstructions for the accelerator 307 to handle.

Figure 4:
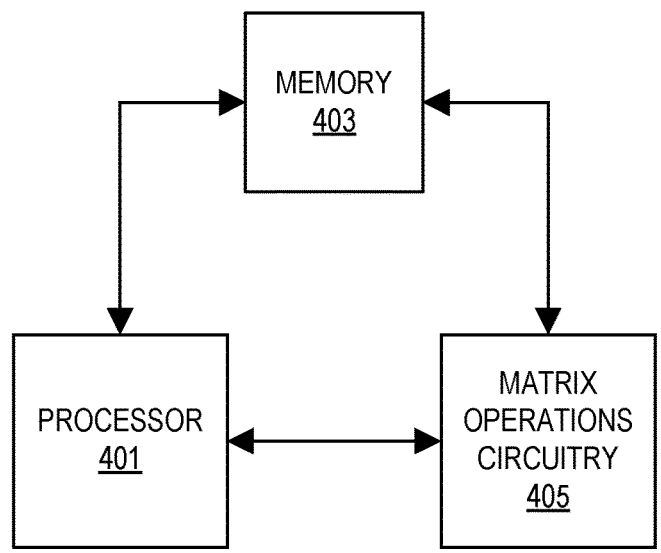
FIGS. 4 and 5 show different embodiments of how memory is shared using a matrix operations accelerator.
Figure 5:
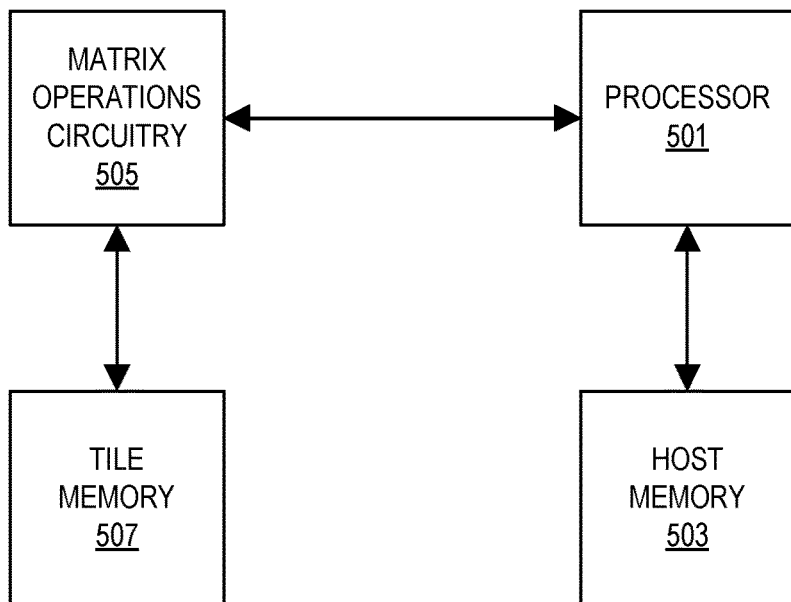

In this example, a coherent memory interface 303 is coupled to the host processor/processing system 301 and matrix operations accelerator 307 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

In some embodiments, tiles are supported using an overlay over physical registers. For example, a tile may utilize 16 1,024-bit registers, 32 512-bit registers, etc. depending on the implementation. In some embodiments, the matrix operations utilize 2-dimensional (2-D) data structures representing one or more packed regions of memory such as registers. Throughout this description, these 2-D data structures are referred to as tiles or tile registers.

In some embodiments, the matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset is stored in the FMA grid 309. As shown, T1 is housed and T0 and T2 are not. Note that A, B, and C refer to the matrices of these tiles which may or may not take up the entire space of the tile.

Figure 6:
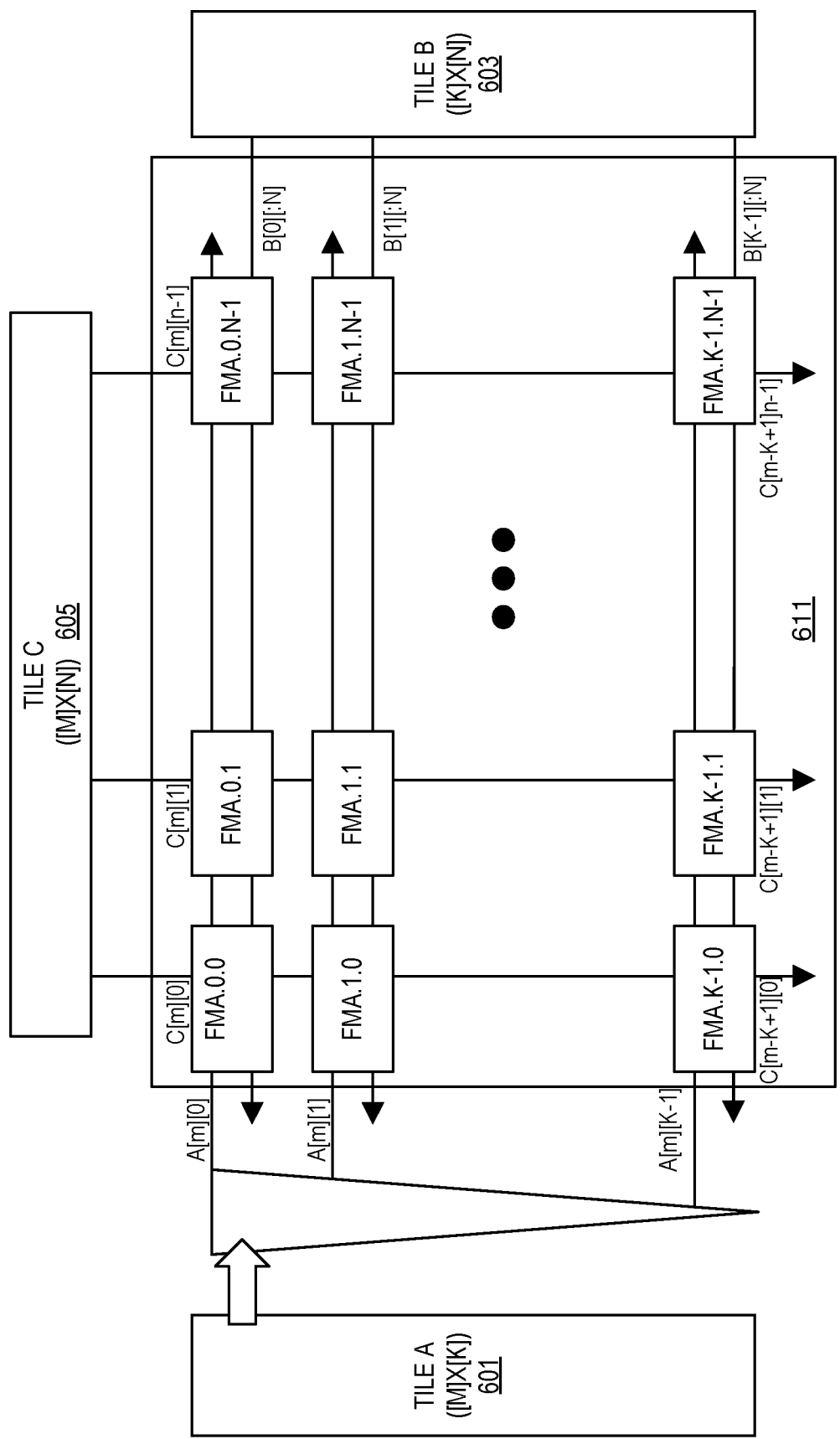
FIG. 6 illustrates an embodiment of matrix multiply accumulate operation using tiles ("TMMA")

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transformed to match up with the columnar dimension of the rectangular grid of FMAs. At each FMA in the grid, an element of A and B are multiplied and added to the incoming summand (from above in the FIG.) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
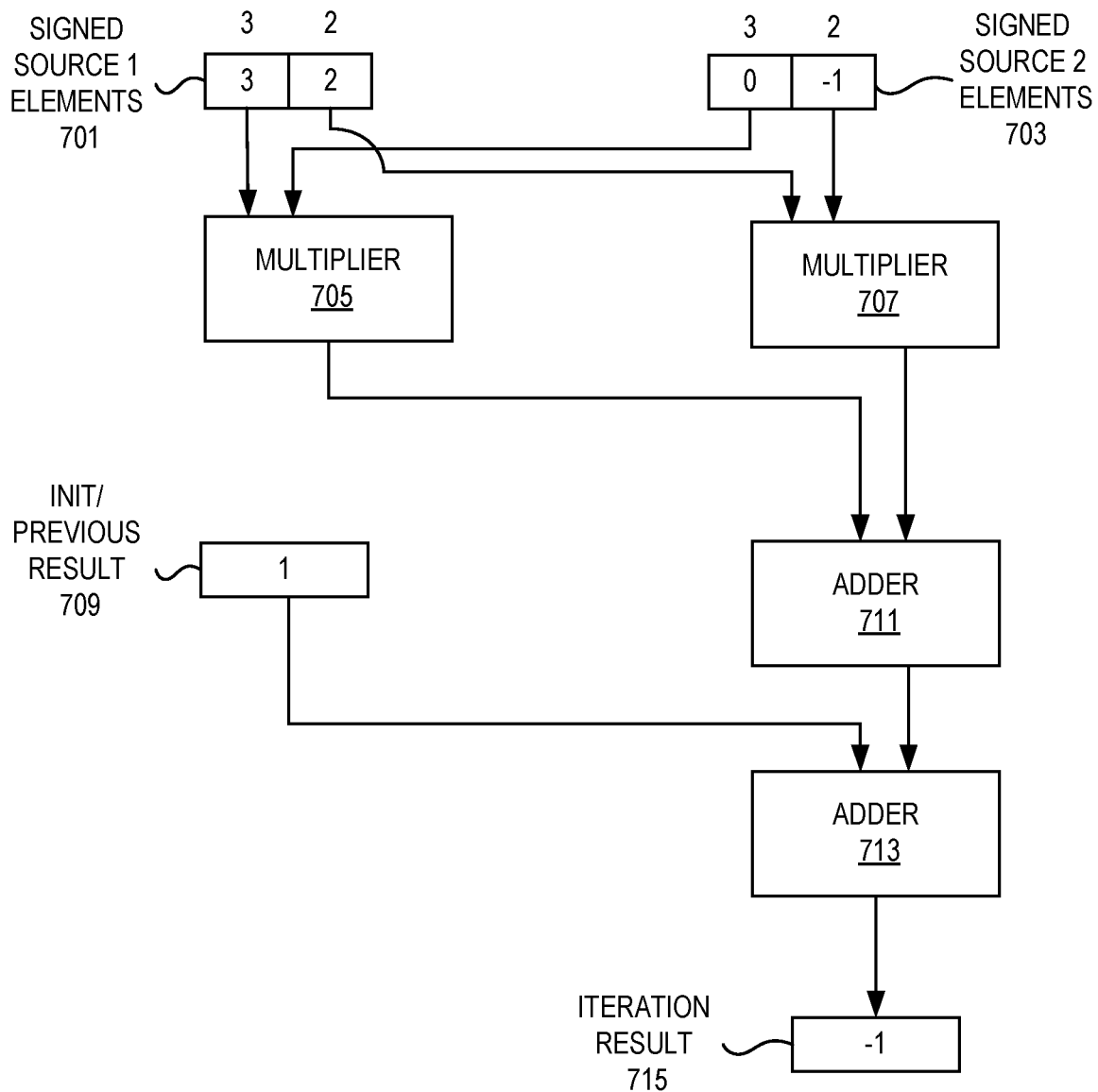
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating-point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating-point) while the third signed source 709 could have 64-bit packed data elements (e.g., double precision floating-point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709 or passed on to the next iteration if there is one. In some embodiments, a writemask is applied to this storage such that if a corresponding writemask (bit) is set, the storage happens, and, if not set, the storage does not happen.

Figure 8:
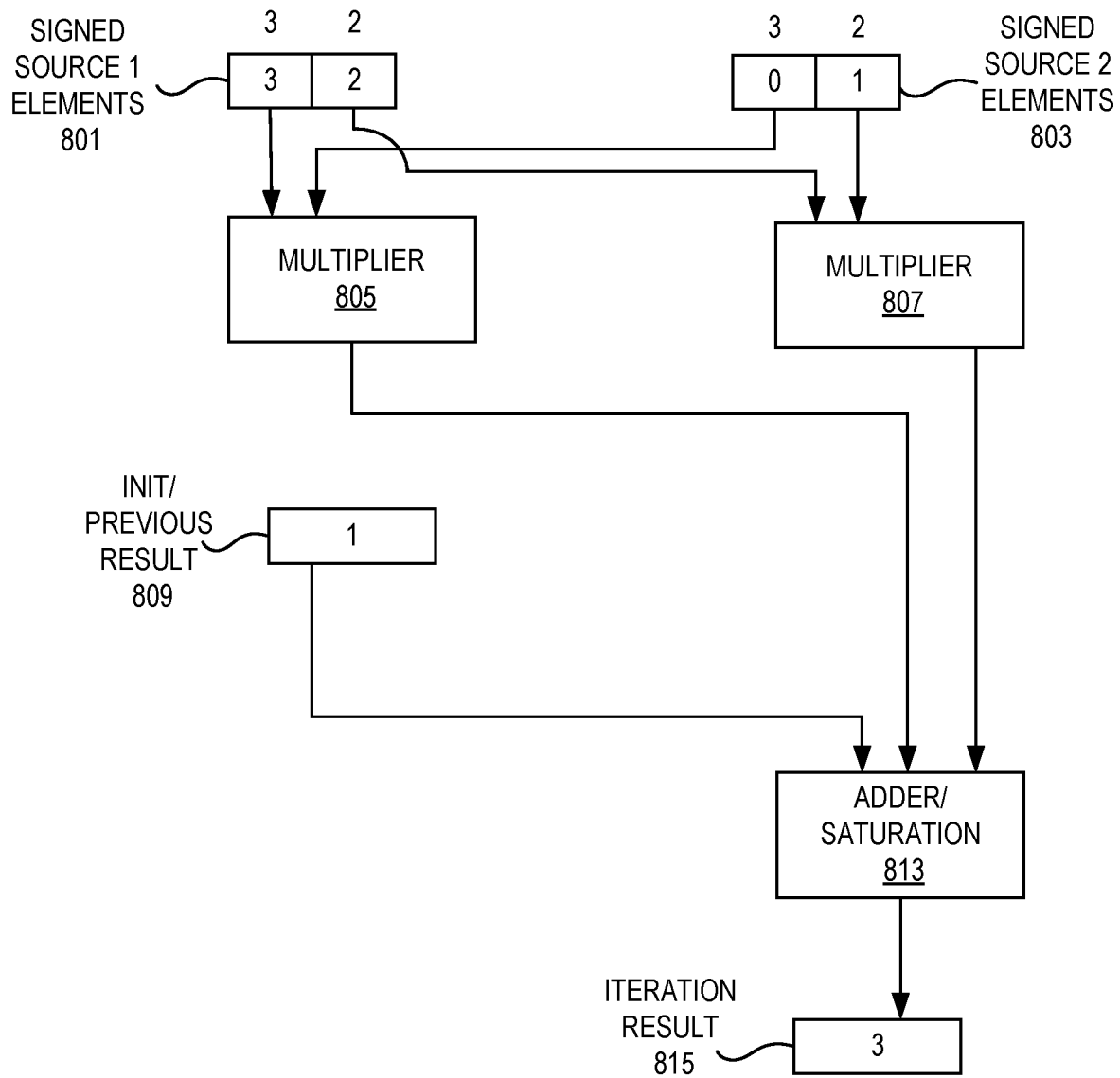
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating-point) the third signed source 809 could have 64-bit packed data elements (e.g., double precision floating-point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, multiplier circuits 805 and 807 perform the multiplications with infinite precision without saturation and use adder/saturation circuitry 813 to saturate the results of the accumulation to plus or minus infinity in case of an overflow and to zero in case of any underflow. In other embodiments, multiplier circuits 805 and 807 perform the saturation themselves. In some embodiments, these multiplier circuits 805 and 807 are reused for other packed data element positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 813.

Addition/saturation (accumulator) circuitry 813 preserves a sign of an operand when the addition results in a value that is too big. In particular, saturation evaluation occurs on the infinite precision result between the multi-way-add and the write to the destination or next iteration. When the accumulator 813 is floating-point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from −128 (=−2^7) to 127(=2^7−1)).

The result of the addition and saturation check is stored into the signed result 815 in a packed data element position that corresponds to the packed data element position used from the signed third source 809 or passed on to the next iteration if there is one. In some embodiments, a writemask is applied to this storage such that if a corresponding writemask (bit) is set, the storage happens, and, if not set, the storage does not happen.

Figure 9:
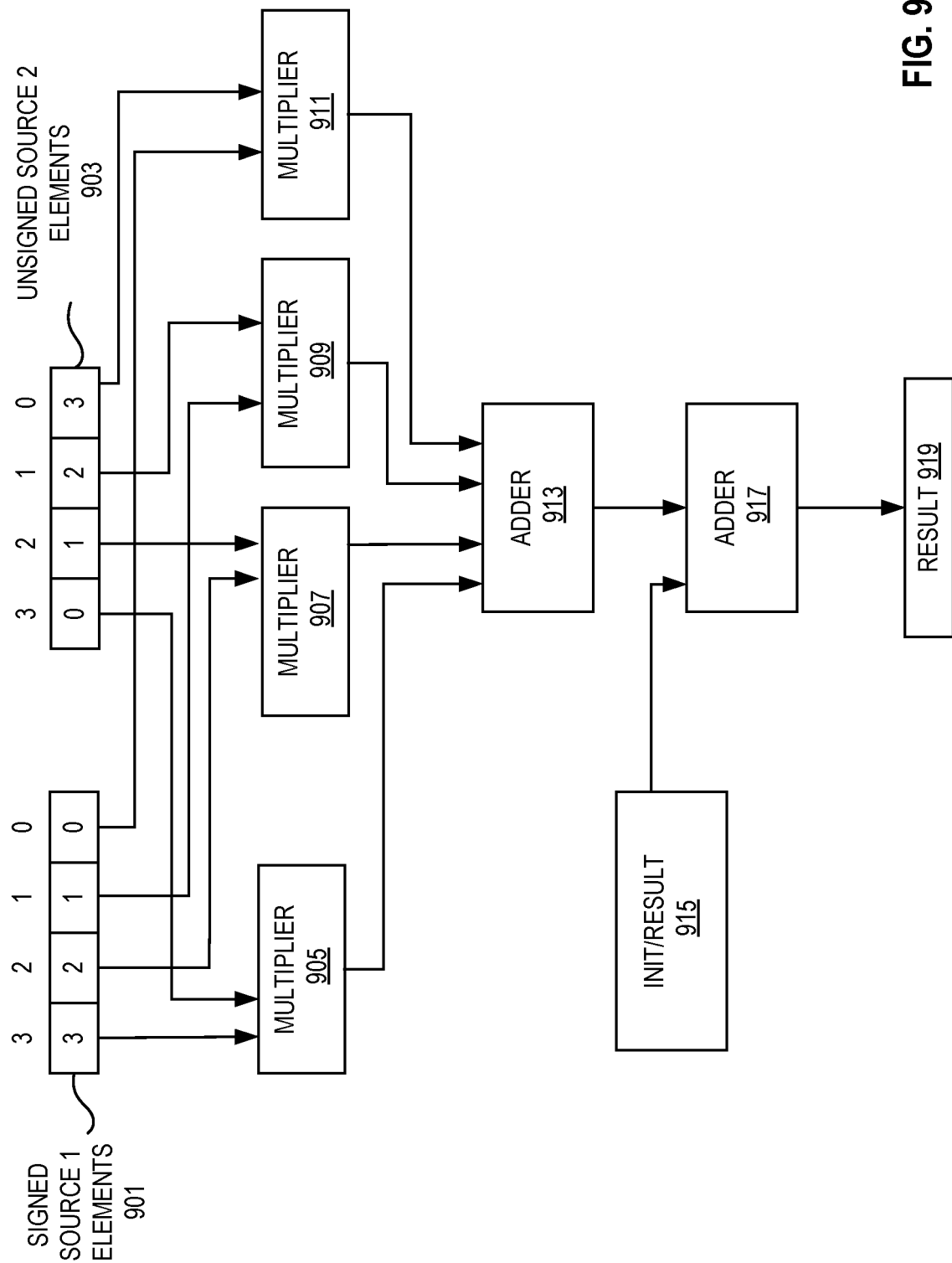
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating-point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating-point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 905, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 913.

The result of the addition of the results of the multiplications is added to the data from most significant packed data element position of the signed source 3 915 (using a different adder 917 or the same adder 913).

Finally, the result 919 of the second addition is either stored into the signed destination in a packed data element position that corresponds to the packed data element position used from the signed third source 915 or passed to the next iteration. In some embodiments, a writemask is applied to this storage such that if a corresponding writemask (bit) is set, the storage happens, and, if not set, the storage does not happen.

Figure 10:
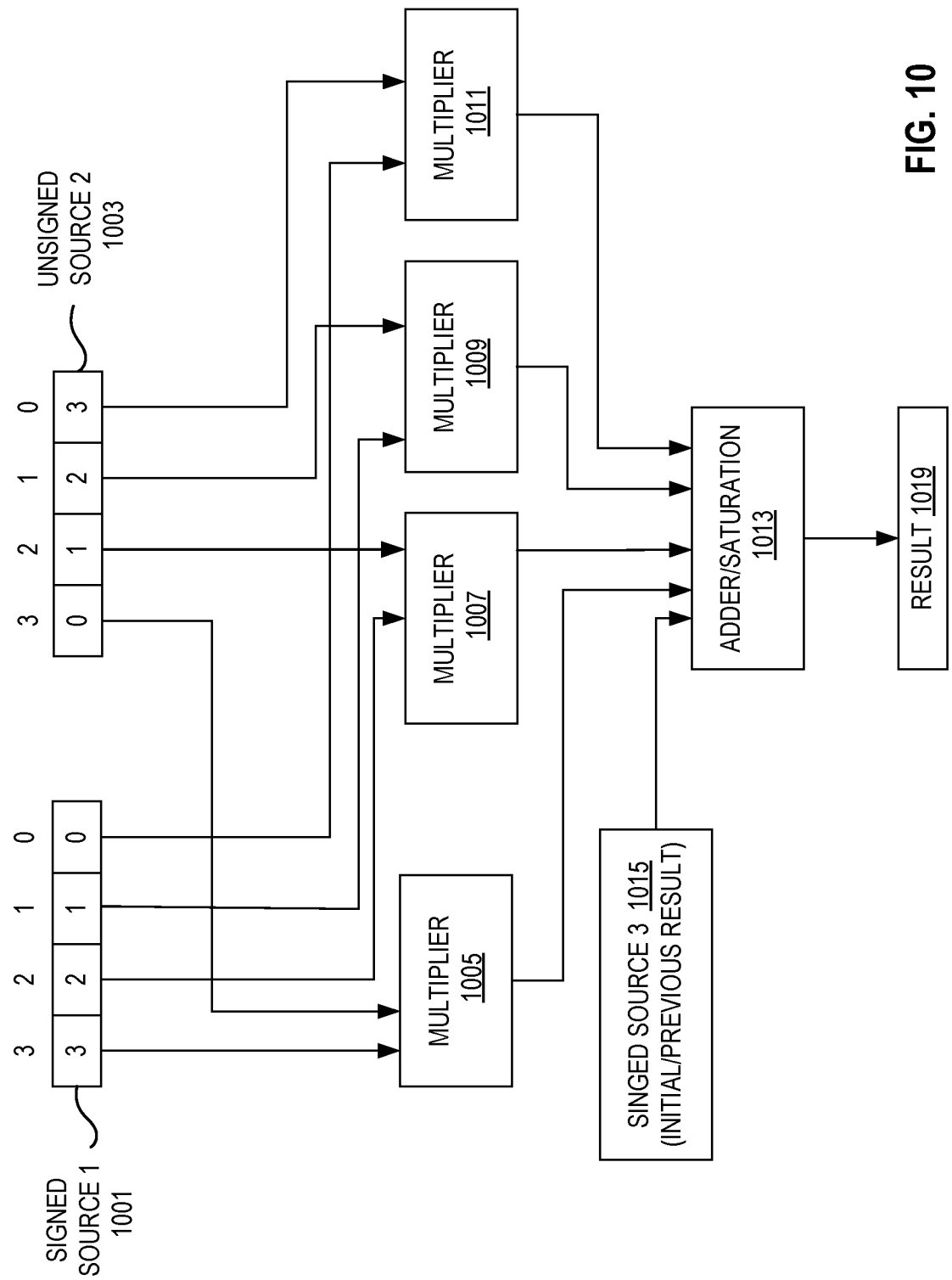
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source 1001 and a second unsigned source 1003 each have four packed data elements. Each of these packed data elements stores data such as floating-point or integer data. A third signed source 1015 (initial or previous result) has a packed data element of which stores signed data. The sizes of the first and second sources are a quarter of the third signed source 1015 (initial or previous result).

For example, the first and second sources could have 16-bit packed data elements (e.g., word) and the third signed source 1015 (initial or previous result) could have 64-bit packed data elements (e.g., double precision floating-point or 64-bit integer).

In this illustration, the four most significant packed data element positions of the first signed source 1001 and the second unsigned source 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first signed source 1001 and the second unsigned source 1003 are multiplied using a multiplier circuit 1005, data from second most significant packed data element positions of the first signed source 1001 and the second unsigned source 1003 are multiplied using a multiplier circuit 1007, data from third most significant packed data element positions of the first signed source 1001 and the second unsigned source 1003 are multiplied using a multiplier circuit 1009, and data from the least significant packed data element positions of the first signed source 1001 and the second unsigned source 1003 are multiplied using a multiplier circuit 1011. In some embodiments, the signed packed data elements of the first signed source 1001 are sign extended and the unsigned packed data elements of the second unsigned source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of third signed source 1015 (initial or previous result). The result of the addition of the results of the multiplications is added to the data from most significant packed data element position of third signed source 1015 (initial or previous result) using adder/saturation 1013 circuitry.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating-point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from third signed source 1015 (initial or previous result) or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-intenger or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
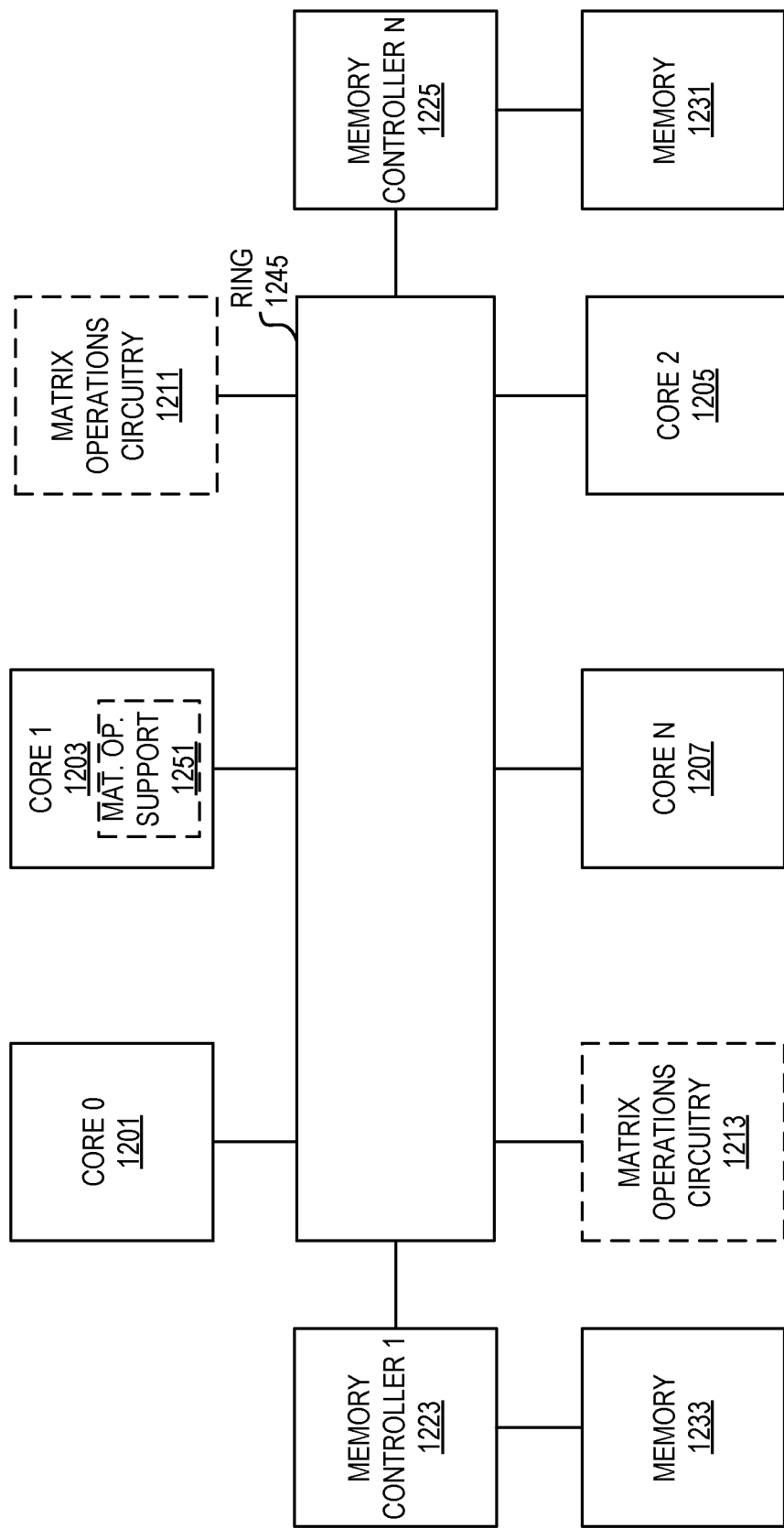
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, multiple entities are coupled with a ring interconnect 1245.

A plurality of cores, core 0 1201, core 1 1203, core 2 1205, and core N 1207 provide non-tile-based instruction support. In some embodiments, matrix operations circuitry 1251 is provided in a core 1203, and in other embodiments matrix operations circuitry 1211 and 1213 are accessible on the ring interconnect 1245.

Additionally, one or more memory controllers 1223-1225 are provided to communicate with memory 1233 and 1231 on behalf of the cores and/or matrix operations circuitry.

Figure 13:
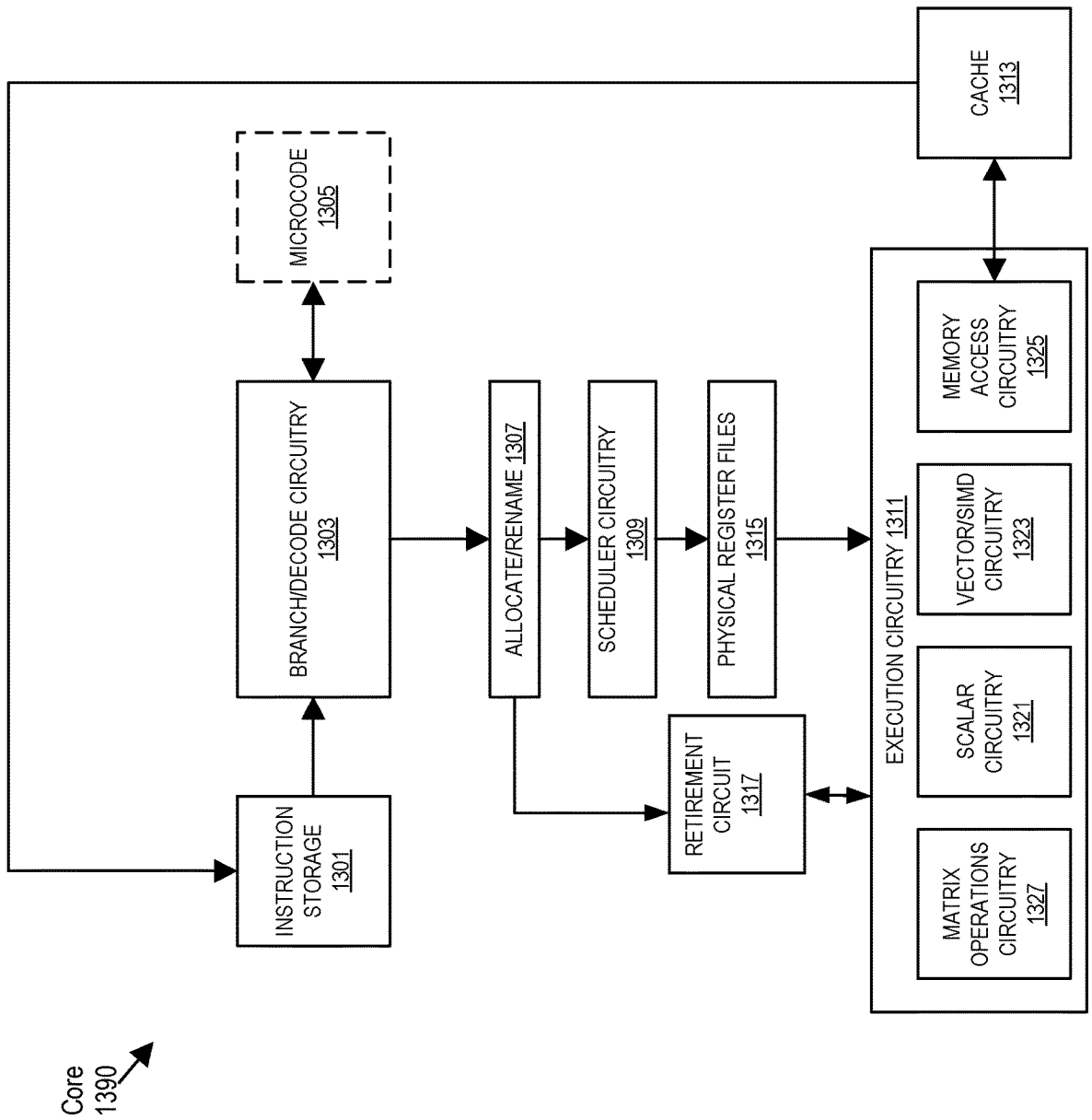
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 is a set of one or more execution circuits, including scalar circuitry 1321, vector/SIMD circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
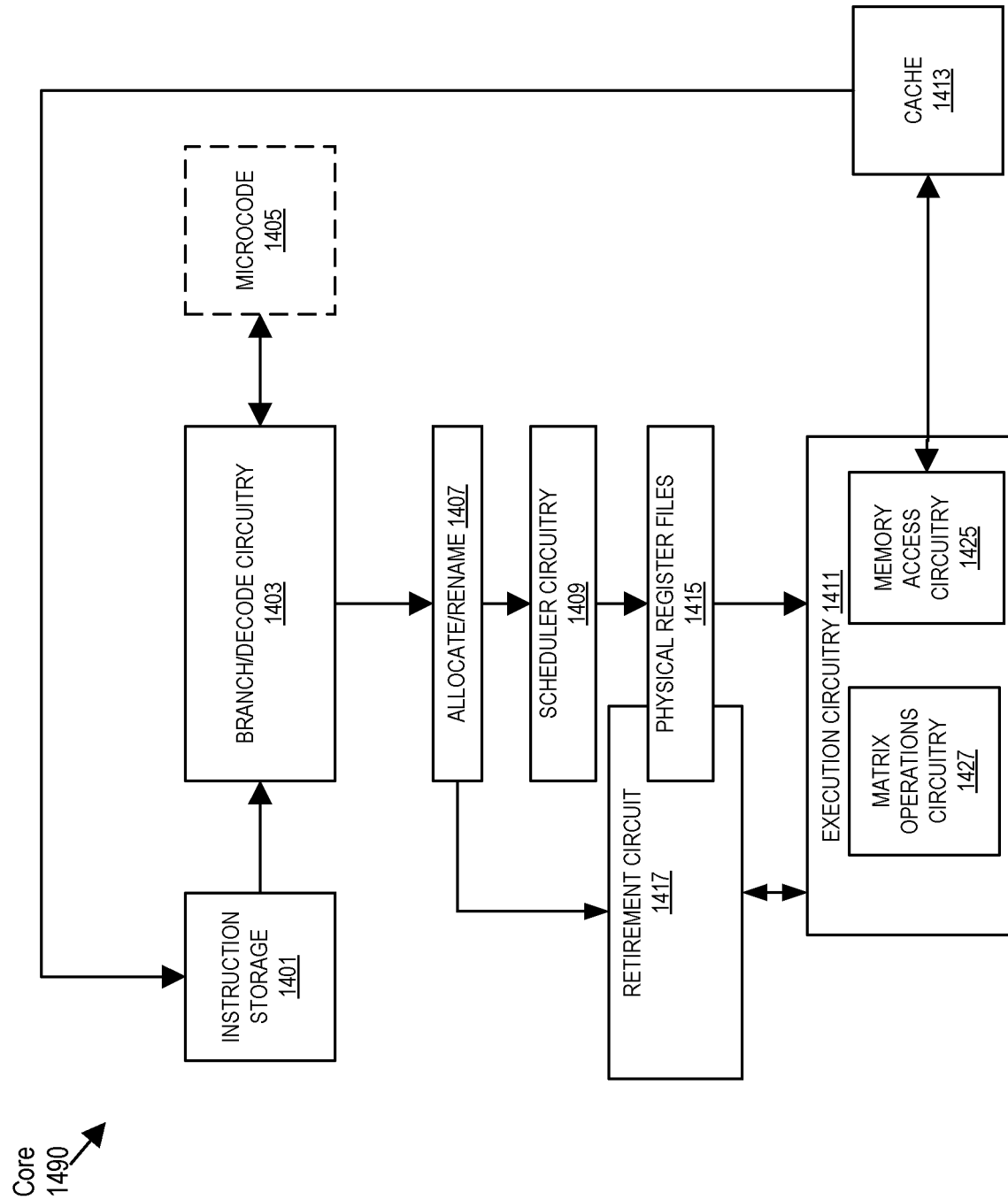
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to allocate/rename 1407 circuitry which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general-purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuitry 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425 to access cache 1413. The execution circuits 1427 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the allocate/rename 1407 circuitry performs an allocation stage and renaming stage; 4) the scheduler circuitry 1409 performs a schedule stage; 5) physical register file(s) (coupled to, or included in, the scheduler circuitry 1409 and allocate/rename 1407 circuitry and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T*B^T=(BA)^T$, where superscript T means transform. Reading column major data as row major data results in the matrix looking like the transform matrix.

In some embodiments, row-major semantics are utilized in hardware, and column major data is to swap the operand order with the result being transforms of matrix, but for subsequent column-major reads from memory it is the correct, non-transformed matrix.

For example, if there are two column-major matrices to multiply:

$$\begin{matrix} ab \\ cd^* \\ ef \end{matrix} \quad \begin{matrix} gik \\ hjl \end{matrix} = \begin{matrix} ag+bh & ai+bj & ak+bl \\ cg+dh & ci+dj & ck+dl \\ eg+fh & ei+fj & ek+fl \end{matrix}$$

$$(3\times 2) \quad (2\times 3) \quad (3\times 3)$$

The input matrices would be stored in linear memory (column-major) as:
a c e b d f
and
g h i j k l.

Reading those matrices as row-major with dimensions 2×3 and 3×2, they would appear as:

$$\begin{matrix} ace \\ bdf \\ kl \end{matrix} \quad \text{and} \quad \begin{matrix} gh \\ ij \end{matrix}$$

Swapping the order and matrix multiplying:

$$\begin{matrix} gh \\ ij \\ kl \end{matrix} * \begin{matrix} ace \\ bdf \end{matrix} = \begin{matrix} ag+bh & cg+dh & eg+fh \\ ai+bj & ci+dj & ei+fj \\ ak+bl & ck+dl & ek+fl \end{matrix}$$

The transform matrix is out and can then be stored in in row-major order:
ag+bh cg+dh eg+fh ai+bj ci+dj ei+fj ak+bl ck+dl ek+fl
and used in subsequent column major computations, it is the correct un-transformed matrix:

$$\begin{matrix} ag+bh & ai+bj & ak+bl \\ cg+dh & ci+dj & ck+dl \\ eg+fh & ei+fj & ek+fl \end{matrix}$$

Exemplary Usage

FIG. 16 illustrates an example of usage of matrices (e.g., tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the matrix A 1603 (tmm2) is re-used twice as it multiplied by two tiles from matrix B 1605. Pointers to load a new A matrix (tile) and two new B matrices (e.g., tiles) from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
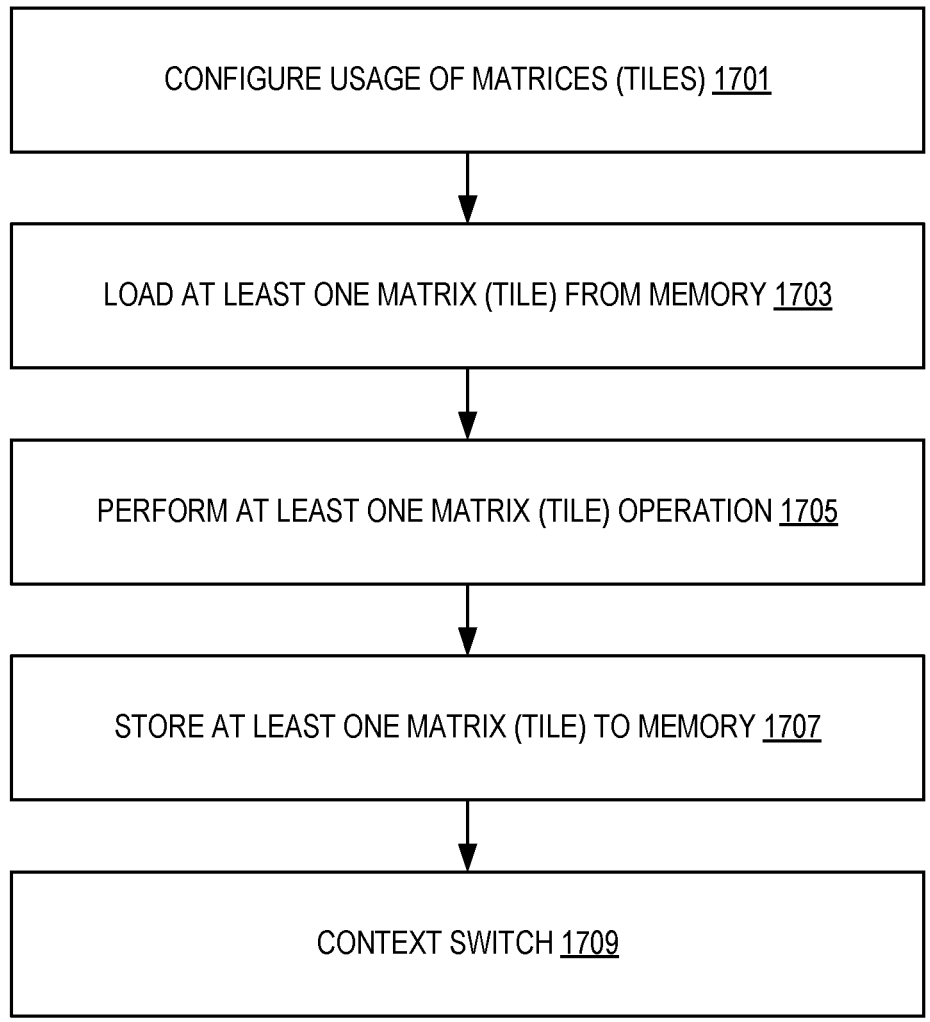
FIG. 17 illustrates an embodiment a method of usage of matrices (tiles)

FIG. 17 illustrates an embodiment of usage of matrices (e.g., tiles). At 1701, tile usage is configured. For example, a TILECONFIG instruction is executed to configure tile usage including setting a number of rows and columns per tile. Typically, at least one matrix (tile) is loaded from memory at 1703. At least one matrix (tile) operation is performed at 1705 using the matrices (e.g., tiles). At 1707, at least one matrix (tile) is stored out to memory and a context switch can occur at 1709.

Exemplary Configuration

Tile Configuration Hardware Support

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L×N) will typically not work if M and L are not the same.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

Tile Usage Configuration

Figure 18:
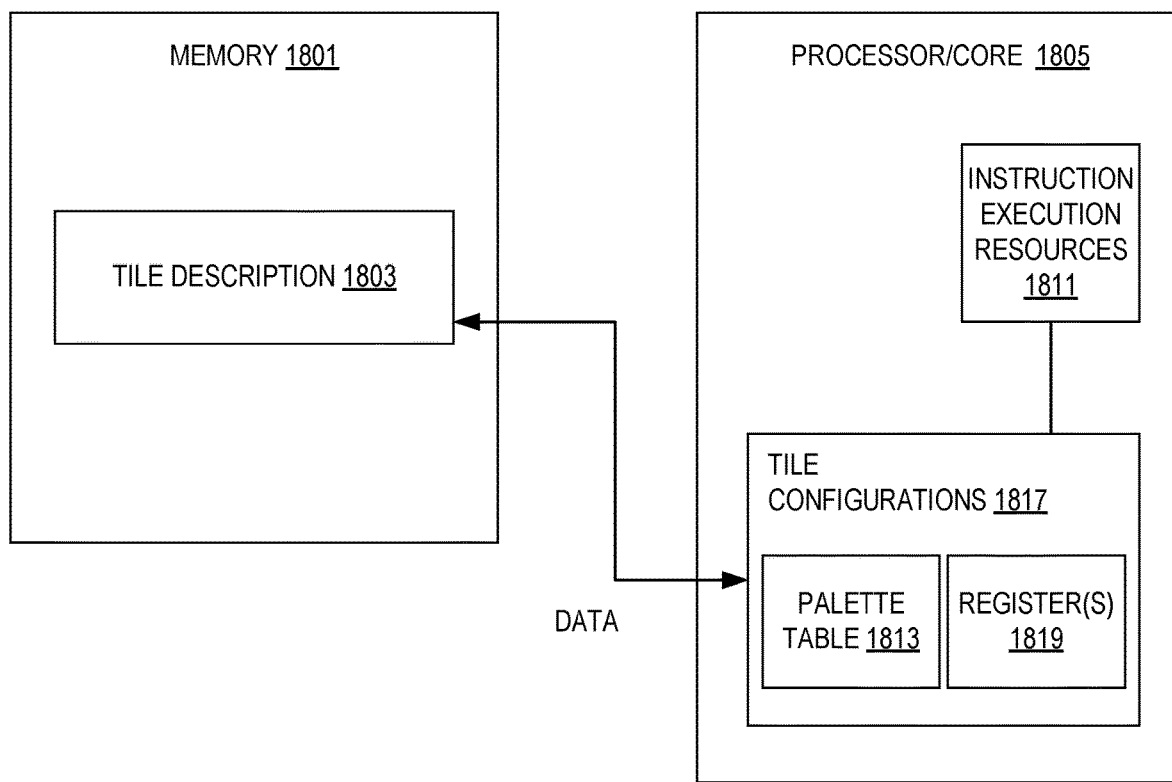
FIG. 18 illustrates support for configuration of the usage of tiles according to an embodiment.

FIG. 18 illustrates support for configuration of the usage of tiles according to an embodiment. A memory 1801 contains the tile description 1803 of the matrices (e.g., tiles) to be supported.

Instruction execution resources 1811 of a processor/core 1805 stores aspects of a tile description 1803 into tile configurations 1817. The tile configurations 1817 include palette table 1813 to detail what tiles for a palette are configured (the number of rows and columns in each tile) and a marking that matrix support is in use. In particular, instruction execution resources 1811 are configured to use tiles as specified by the tile configurations 1817. The instruction execution resources 1811 may also include a machine specific register or configuration register to indicate tile usage. Additional values such as in-use and start values are also set. The tile configurations 1817 utilize register(s) 1819 to store tile usage and configuration information.

FIG. 19 illustrates an embodiment of a description of the matrices (e.g., tiles) to be supported. This is the description that is to be stored upon an execution of a STTILECFG instruction. In this example, each field is a byte. In byte [0], a palette ID 1901 is stored. The palette ID is used to index a palette table 1813 which stores, per palette ID, a number of bytes in a tile, and bytes per row of the tiles that are associated with this ID as defined by the configuration.

Byte 1 stores a value to be stored in a "startRow" register 1903 and byte 2 stores a value to be stored in a register, startP 1905. To support restarting instructions after these events, the instructions store information these registers. To support restarting instructions after break events such as those detailed above, the instructions store information in these registers. The startRow value indicates the row that should be used for restart. The startP value indicates the position within the row for store operations when pairs are used and, in some embodiments, indicates the lower half of the row (in the lower tile of a pair) or higher half of the row (in the higher tile of a pair). Generally, the position in the row (the column) is not needed.

With the exception of TILECONFIG and STTILECFG, successfully executing matrix (tile) instructions will set both startRow and startP to zero.

Any time an interrupted matrix (tile) instruction is not restarted, it is the responsibility of software to zero the startRow and startP values. For example, unmasked floating-point exception handlers might decide to finish the operation in software and change the program counter value to another instruction, usually the next instruction. In this case the software exception handler must zero the startRow and startP values in the exception presented to it by the operating system before resuming the program. The operating system will subsequently reload those values using a restore instruction.

Byte 3 stores an indication of pairs (1b per tile) of tiles 1907.

Bytes 16-17 store the number of rows 1913 and columns 1915 for tile 0, bytes 18-19 store the number of rows and columns for tile 1, etc. In other words, each 2-byte group specifies a number of rows and columns for a tile. If a group of 2 bytes is not used to identify tile parameters, they should have the value zero. Specifying tile parameters for more tiles than the implementation limit or the palette limit results in a fault. Unconfigured tiles are set to an initial state with 0 rows, 0 columns.

Finally, the configuration in memory typically ends with an ending delineation such as all zeros for several consecutive bytes.

Exemplary Tile and Tile Configuration Storage

Figure 20A:
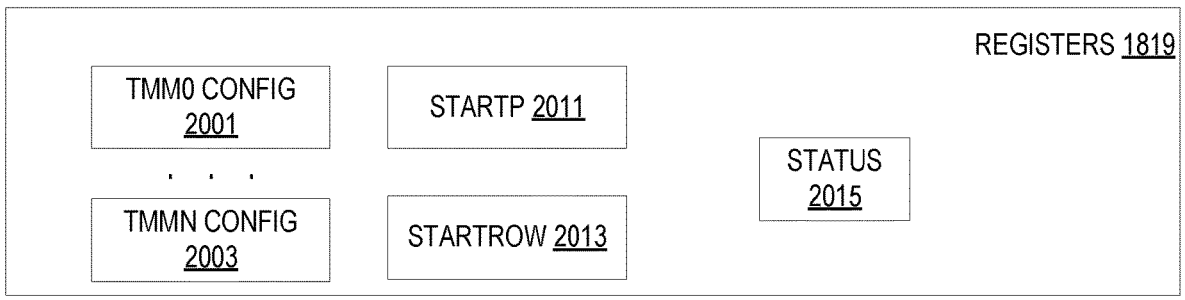
FIGS. 20(A)-(D) illustrate examples of register(s)

FIGS. 20(A)-(D) illustrate examples of register(s) 1819. FIG. 20(A) illustrates a plurality of registers 1819. As shown each tile (TMM0 2001 . . . TMMN 2003) has a separate register with each register storing a row and column size for that particular tile. StartP 2011 and StartRow 2013 are stored in separate registers. One or more status registers 2015 are set (e.g., TILES_CONFIGURED=1) to indicate tiles are configured for use.

Figure 20B:
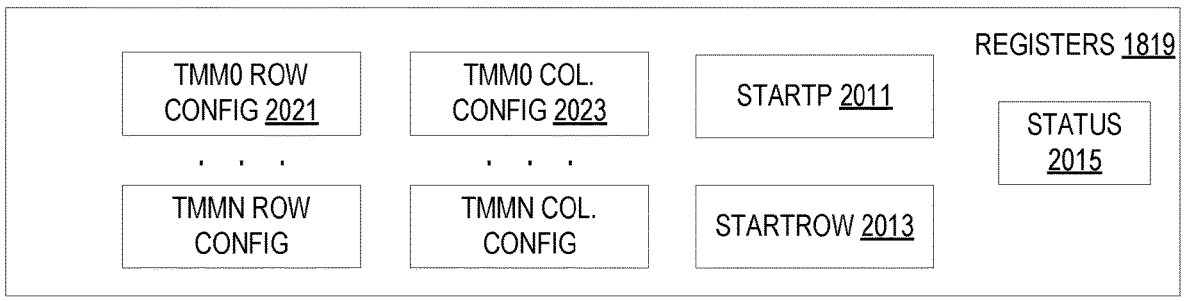

FIG. 20(B) illustrates a plurality of registers 1819. As shown each tile has separate registers for its rows and columns. For example, TMM0 rows configuration 2021, TMM0 columns configuration 2023, StartP 2011 and StartRow 2013 are stored in separate registers. One or more status registers 2015 are set (e.g., TILES_CONFIGURED=1) to indicate tiles are configured for use.

Figure 20C:

FIG. 20(C) illustrates a single register 1819. As shown, this register stores tile configurations (rows and columns per tile) 2031, StartP 2011, and StartRow 2013 are stored in single register as packed data registers. One or more status registers 2015 are set (e.g., TILES_CONFIGURED=1) to indicate tiles are configured for use.

Figure 20D:

FIG. 20(D) illustrates a plurality of registers 1819. As shown, a single register stores tile configuration (rows and columns per tile) 2031. StartP and StartRow are stored in separate registers 2011 and 2013. One or more status registers 2015 are set (e.g., TILES_CONFIGURED=1) to indicate tiles are configured for use.

Other combinations are contemplated such as combining the start registers into a single register where they are shown separately, etc.

Detailed herein embodiments of one or more instructions to convert an identified row from a first source (e.g., a tile (matrix operand)) from a first precision (e.g., FP32) to a second precision (e.g., FP16/BF16) and interleave the second precision data elements with a second source in a destination having data elements of the second precision. The interleaving may vary. In some embodiments, the tile data elements are placed in the upper 16 bits of a 32-bit element (which may be a logical construct) of the destination while the second source is assumed to contain elements in the high 16-bit which are then shifted left by 16 bits and placed in the low 16-bit of the destination. Alternative embodiments reverse the order and/or shift direction, as well as assume the second source holds values in the low 16-bit.

Detailed herein embodiments of one or more instructions to convert an identified row from a source/destination (e.g., a tile (matrix operand)) from a first precision (e.g., FP32) to a second precision (e.g., FP16/BF16) and interleave the second precision data elements with a second source having data elements of the second precision. The interleaving may vary. In some embodiments, the tile data elements are placed in the upper 16 bits of a 32-bit element (which may be a logical construct) of the source/destination while the second source is assumed to contain elements in the high 16-bit which are then shifted left by 16 bits and placed in the low 16-bit of the destination. Alternative embodiments reverse the order and/or shift direction, as well as assume the second source holds values in the low 16-bit.

As mentioned above, special hardware for General Matrix Multiplication (a.k.a., GEMM), is a good option for improving the peak compute performance (and energy efficiency) of certain applications, such as deep learning. Some of these applications, including deep learning, can operate on input data elements with relatively few bits without losing accuracy, as long as the output elements have enough bits (i.e., more than the inputs).

In certain embodiments, one 16-bit floating point format is a sixteen bit wide Institute of Electrical and Electronics Engineers (IEEE) (e.g., IEEE 754 standard) half-precision binary floating-point format (IEEE float16) having a sign field (one bit wide), an exponent field (five bits wide), and a mantissa (significant precision) field (eleven bits implicitly stored, i.e., ten bits wide explicitly stored). In certain embodiments, another 16-bit floating point format is a sixteen-bit wide, brain floating point format (bfloat16) having a sign field (one bit wide), an exponent field (eight bits wide), and a mantissa (significand precision) field (eight bits implicitly stored, i.e., seven bits wide explicitly stored). In certain embodiments, a mantissa (significand precision) field is presumed to have an implicit leading bit with value of one, unless the exponent field is stored with all zeros. Further, a 32-bit floating-point format may include binary32 (according to an IEEE standard), which is sometimes referred to herein as "single-precision" or "fp32", e.g., having a sign field (one bit wide), an exponent field (eight bits wide), and a mantissa (significand precision) field (twenty four bits implicitly stored, i.e., twenty three bits wide explicitly stored).

In some embodiments, the mnemonic for the opcode of instruction is TCVTROWPS2PHIE (e.g., Tile Convert Row Single Precision 2 Half Precision Interleave). The instruction includes one or more fields for the opcode. Exemplary instruction contents are as indicated in the table below and exemplary formats are provided later.

| OPCODE | DESTI-NATION/ SOURCE | SOURCE 1 | SOURCE 2 | IMME-DIATE |
|---|---|---|---|---|
| TCVTROWPS2PHIE | Tile (destination) | Tile (source) | Register (vector/SIMD) (storing second precision elements) | Index |
| TCVTROWPS2PHIE | Tile (source/ destination) | | Register (vector/SIMD) (storing second precision elements) | |
| TCVTROWPS2PHIE | Register (destination) | Tile (source) | Register (vector/SIMD) (storing second precision elements) | Index |
| TCVTROWPS2PHIE | Register (destination/ source) | Tile (source) | Register (storing index) | |

Depending upon the implementation, the data elements of the source(s) and destination are 32-bit or 16-bit in size. In some embodiments, the data element sizes are different between at least one source and the destination. In some embodiments, a rounding mode (round to nearest even, round down, round up, truncate, etc.) is specified by a control register (e.g., MXSR). In some embodiments, the instructions use a VEX prefix, and the operands are identified by REG(w) and/or R/M(r). In some embodiments, SIB addressing is used. More particulars of formats that may be use are detailed later.

Figure 21:
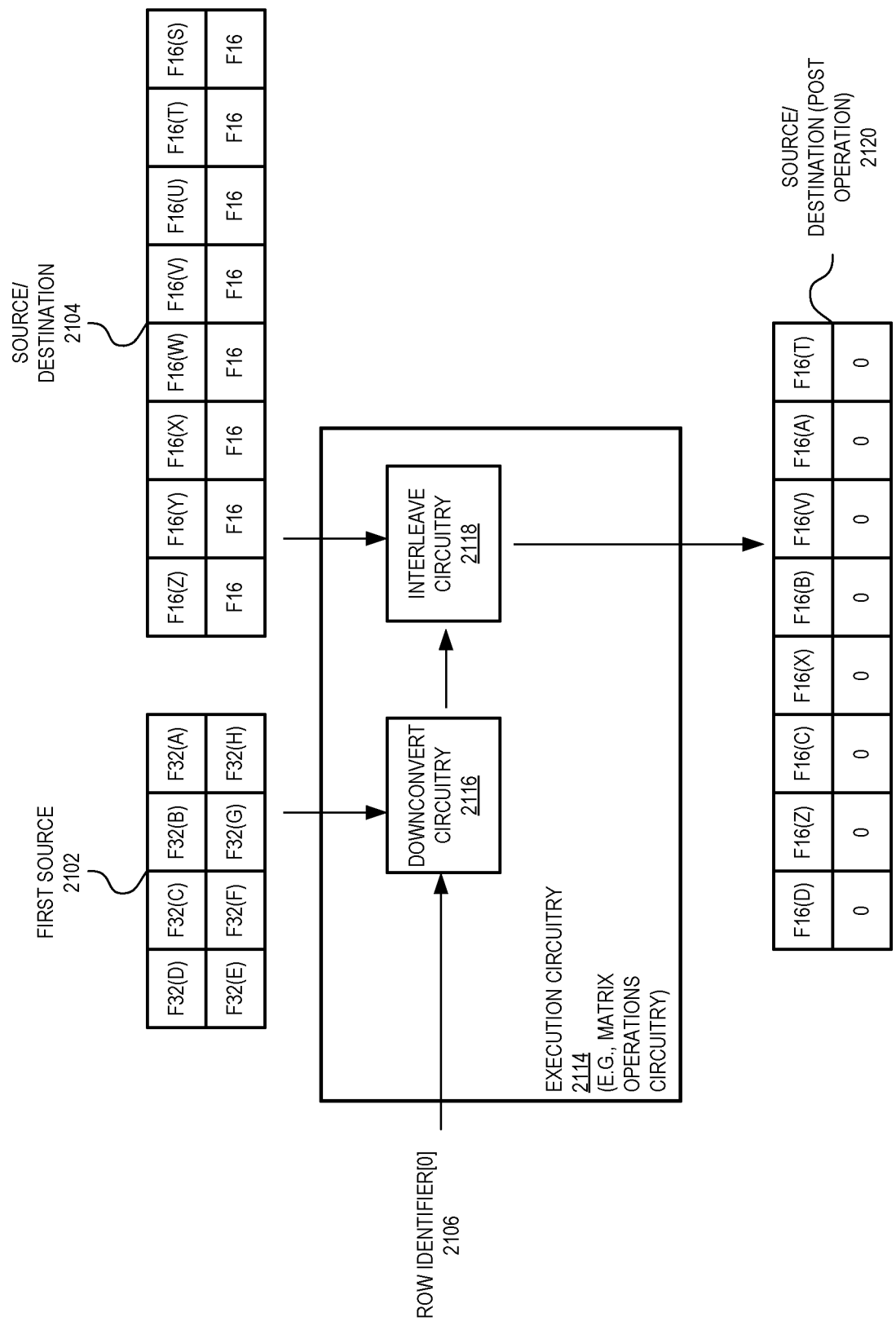
FIG. 21 illustrates embodiments illustrating an execution of an instruction that downconverts data elements of a first source and interleaves them with data elements of the same type in a destination.

FIG. 21 illustrates embodiments illustrating an execution of an instruction that downconverts data elements of a first source and interleaves them with data elements of the same type in a destination. A first source 2102 is a tile that has two rows. Each of the rows has four 32-bit values. A second source 21044 acts as a source and destination (source/destination). This source/destination is also a tile. In this example, the data elements of the second source 21044 are each 16-bit. However, the second source 2014 may also use 32-bit data elements wherein the data elements store a 16-bit value in each half (upper and lower).

A row identifier (either from an immediate or a value stored in a register) 2106 indicates to execution circuitry 2114 (e.g., matrix operations circuitry detailed earlier) that row 0 of the first source 2102 is to be downconverted (e.g., from FP32 to FP16 or BF16) using downconvert circuitry 2116.

The downconverted values are passed to interleave circuitry 2118 which interleaves with the data elements of the source/destination 2104 that are of the same downconverted type. In this example, the interleaving involves shifting the data elements of the source/destination 2104 (and placing in the lower half of 32-bit data element or logical 32-bit data element) and interleaving the downconverted elements into the upper half of 32-bit data element or logical 32-bit data element) to form a source/destination 2120 (post operation). In this example, the remaining rows of the source/destination 2120 (post operation) are zeroed. However, in other embodiments, these elements are left alone. In some embodiments, the index indicates the row to downconvert and the row for which interleaving is to occur in the destination.

Figure 22:
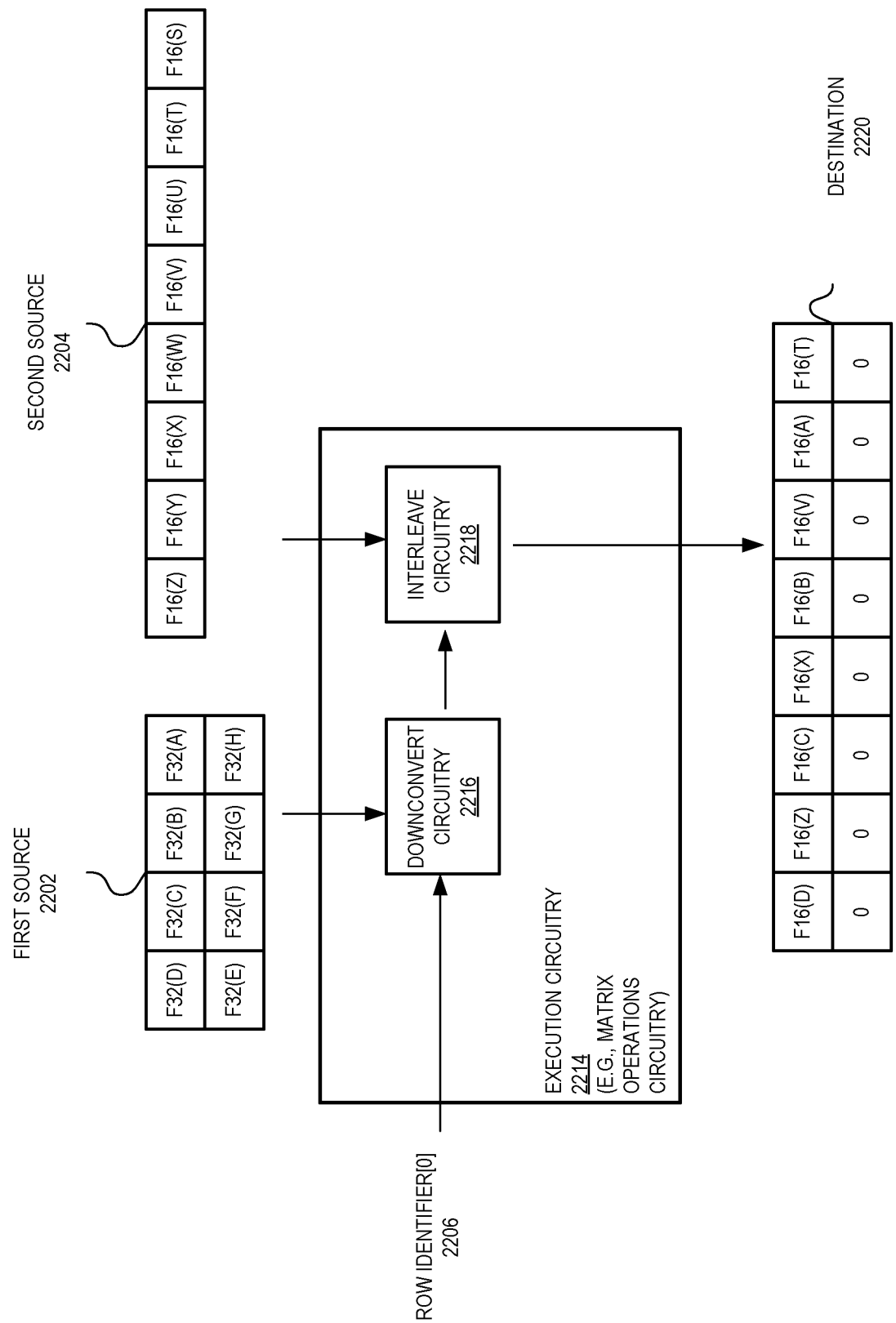
FIG. 22 illustrates embodiments illustrating an execution of an instruction that downconverts data elements of a first source and interleaves them with data elements of the same type in a destination.

FIG. 22 illustrates embodiments illustrating an execution of an instruction that downconverts data elements of a first source and interleaves them with data elements of the same type in a destination. A first source 2202 is a tile that has two rows. Each of the rows has four 32-bit values. A second source 2204 is a vector or SIMD register. In this example, the data elements of the second source 2204 are each 16-bit. However, the second source 2204 may also use 32-bit data elements wherein the data elements store a 16-bit value in each half (upper and lower).

A row identifier (either from an immediate or a value stored in a register) 2106 indicates to execution circuitry 2114 (e.g., matrix operations circuitry detailed earlier) that row 0 of the first source 2102 is to be downconverted (e.g., from FP32 to FP16 or BF16) using downconvert circuitry 2116.

The downconverted values are passed to interleave circuitry 2118 which interleaves with the data elements of the source 2204 that are of the same downconverted type. In this example, the interleaving involves shifting the data elements of the source 2204 (and placing in the lower half of 32-bit data element or logical 32-bit data element) and interleaving the downconverted elements into the upper half of 32-bit data element or logical 32-bit data element) to be stored in destination 2220. In this example, the remaining rows of the destination 2220 are zeroed. However, in other embodiments, these elements are left alone. In some embodiments, the index indicates the row to downconvert and the row for which interleaving is to occur in the destination.

Exemplary Method(s) of Execution

Figure 23:
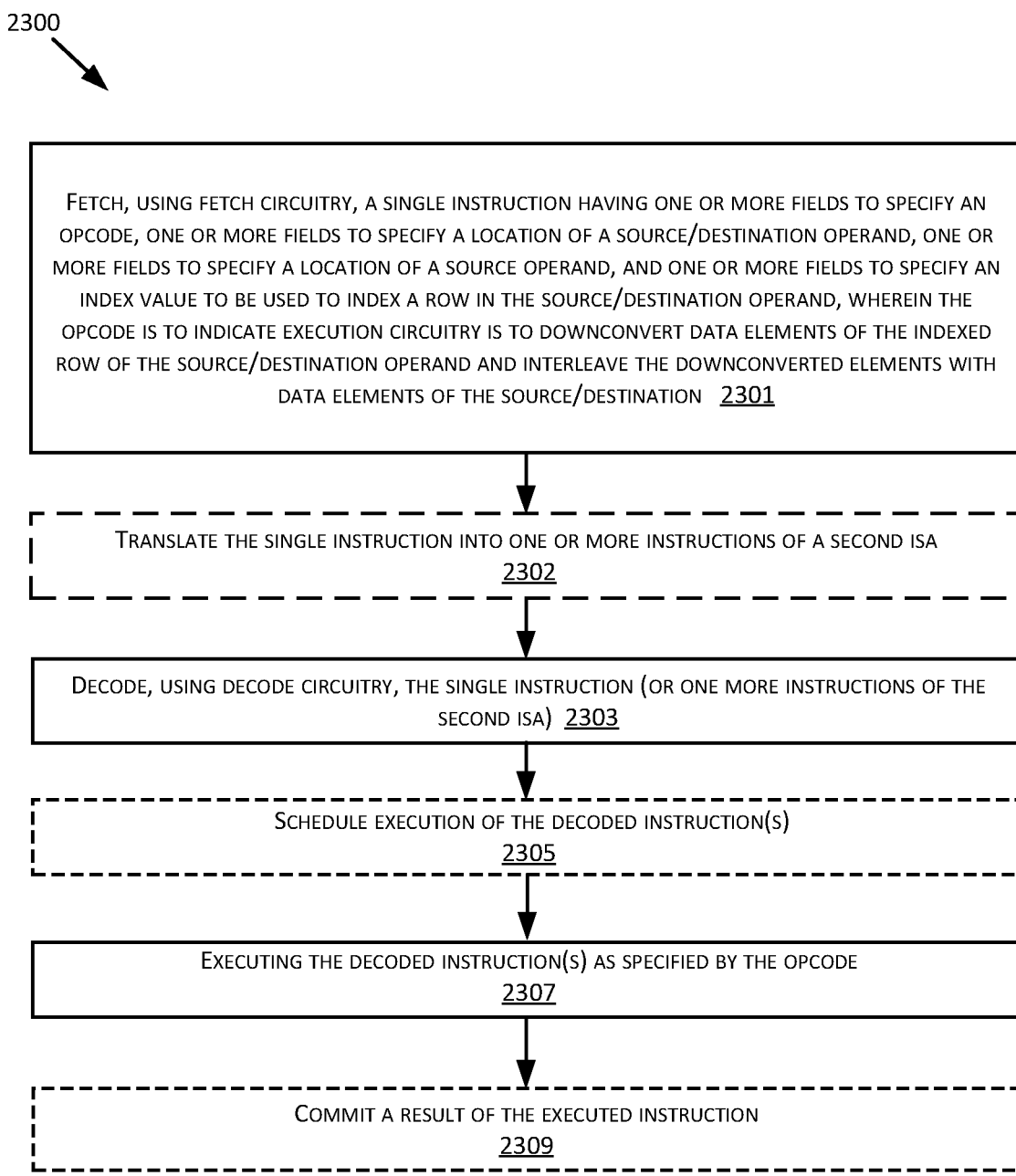
FIG. 23 is a block flow diagram illustrating a core or processor responding to a TCVTROWPS2PHIE instruction.

FIG. 23 is a block flow diagram illustrating a core or processor responding to a TCVTROWPS2PHIE instruction. As shown in flow diagram 2300, at 2301, a single instruction having one or more fields to identify an opcode, one or more fields to identify a location of a source/destination operand, one or more fields to identify a location of a source operand, and one or more fields to specify an index value to be used to index a row in the source/destination operand, wherein the opcode is to indicate execution circuitry is to downconvert data elements of the indexed row of the source/destination operand and interleave the downconverted elements with data elements of the source/destination is fetched.

In some embodiments, the identified source/destination operand is a tile register. For example, in embodiments that use a processor's physical register file (for example, or use one or more two-dimensional (2D) (e.g., AMX) tile registers, e.g., tile registers formed from data buffers 305 in FIG. 3, which in certain embodiments are separate from any scalar and/or vector (e.g., one dimensional array) registers) to store matrices (e.g., tiles), since the destination elements are twice as wide as the source elements, having a pair of 16-bit single-precision floating-point format values in the source allows efficient use, e.g., when matrices (e.g., tiles) are a collection of vector registers, of the same type of vector register, be it a 128-bit register, a 256-bit register, or a 512-bit registers. Such efficient use can also be achieved when the matrices are stored in (e.g., AMX) tile registers. In other embodiments, a single source vector having 16-bit floating-point elements is converted into 32-bit elements stored in a destination vector having half the width of the source vector.

In some embodiments, the identified source/destination operand is a vector or SIMD register.

In some embodiments, the identified source operand is a tile register. In some embodiments, the identified source operand is a vector or SIMD register.

In some embodiments, the index value is specified in an immediate. In some embodiments, the index value is specified in an identified register.

In some embodiments, the fetched single instruction is translated into one or more instructions of a second ISA at 2302.

At 2303, the single instruction is translated into one or more instructions of a second ISA in some embodiments.

The fetched instruction (or one or more instructions of the second ISA) is/are decoded by decode circuitry such as that detailed herein. In the context of the illustrated system, decode circuitry may be that illustrated and described at least with respect to FIGS. 13, 14, etc.

At 2305, execution of the decoded instruction is scheduled (as needed), which is optional (as indicated by its dashed border) insofar as it may occur at a different time, or not at all.

At 2307, the decoded instruction(s) is/are executed as specified by the opcode.

Example execution circuitry is further illustrated and described with respect to FIGS. 3-14, etc. In some embodiments, execution circuitry caused execution by (e.g., offload to) a matrix operations accelerator, such as that illustrated and described as accelerator 307 (FIG. 3). In some embodiments, execution circuitry is a matrix operations circuit, such as matrix operations circuitry 405 (FIG. 4), 505 (FIG. 5), or 1213 (FIG. 12), and 1327 (FIG. 13).

In some embodiments, the instruction is committed or retired at 2309, which is optional (as indicated by its dashed border) insofar as it may occur at a different time, or not at all.

Figure 24:
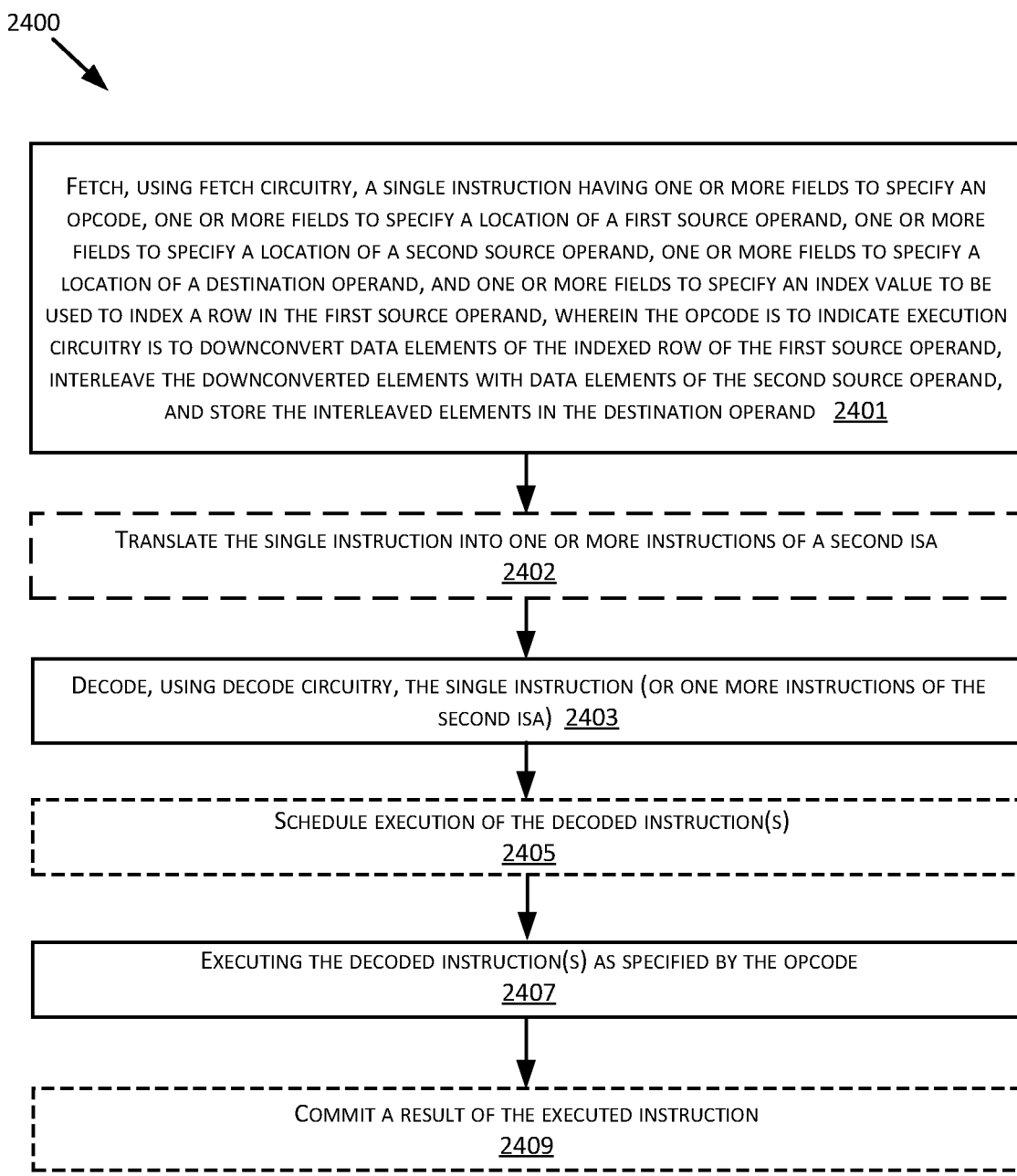
FIG. 24 is a block flow diagram illustrating a core or processor responding to a TCVTROWPS2PHIE instruction.

FIG. 24 is a block flow diagram illustrating a core or processor responding to a TCVTROWPS2PHIE instruction. As shown in flow diagram 2400, at 2401, a single instruction having one or more fields to specify an opcode, one or more fields to specify a location of a first source operand, one or more fields to specify a location of a second source operand, one or more fields to specify a location of a destination operand, and one or more fields to specify an index value to be used to index a row in the first source operand, wherein the opcode is to indicate execution circuitry is to downconvert data elements of the indexed row of the first source operand, interleave the downconverted elements with data elements of the second source operand, and store the interleaved elements in the destination operand.

In some embodiments, the identified source/destination operand is a tile register. For example, in embodiments that use a processor's physical register file (for example, or use one or more two-dimensional (2D) (e.g., AMX) tile registers, e.g., tile registers formed from data buffers 305 in FIG. 3, which in certain embodiments are separate from any scalar and/or vector (e.g., one dimensional array) registers) to store matrices (e.g., tiles), since the destination elements are twice as wide as the source elements, having a pair of 16-bit single-precision floating-point format values in the source allows efficient use, e.g., when matrices (e.g., tiles) are a collection of vector registers, of the same type of vector register, be it a 128-bit register, a 256-bit register, or a 512-bit registers. Such efficient use can also be achieved when the matrices are stored in (e.g., AMX) tile registers. In other embodiments, a single source vector having 16-bit floating-point elements is converted into 32-bit elements stored in a destination vector having half the width of the source vector.

In some embodiments, the identified source/destination operand is a vector or SIMD register.

In some embodiments, the identified source operand is a tile register. In some embodiments, the identified source operand is a vector or SIMD register.

In some embodiments, the index value is specified in an immediate. In some embodiments, the index value is specified in an identified register.

In some embodiments, the fetched single instruction is translated into one or more instructions of a second ISA at 2402.

At 2403, the single instruction is translated into one or more instructions of a second ISA in some embodiments.

The fetched instruction (or one or more instructions of the second ISA) is/are decoded by decode circuitry such as that detailed herein. In the context of the illustrated system, decode circuitry may be that illustrated and described at least with respect to FIGS. 13, 14, etc.

At 2405, execution of the decoded instruction is scheduled (as needed), which is optional (as indicated by its dashed border) insofar as it may occur at a different time, or not at all.

At 2407, the decoded instruction(s) is/are executed as specified by the opcode.

Example execution circuitry is further illustrated and described with respect to FIGS. 3-14, etc. In some embodiments, execution circuitry caused execution by (e.g., offload to) a matrix operations accelerator, such as that illustrated and described as accelerator 307 (FIG. 3). In some embodiments, execution circuitry is a matrix operations circuit, such as matrix operations circuitry 405 (FIG. 4), 505 (FIG. 5), or 1213 (FIG. 12), and 1327 (FIG. 13).

In some embodiments, the instruction is committed or retired at 2409, which is optional (as indicated by its dashed border) insofar as it may occur at a different time, or not at all.

FIG. 25 illustrates examples of pseudo code for the execution of the TCVTROWPS2PHIE instruction.

The above embodiments may be embodied in several different types of architectures, systems, and instruction formats, examples of which are detailed below.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 26:
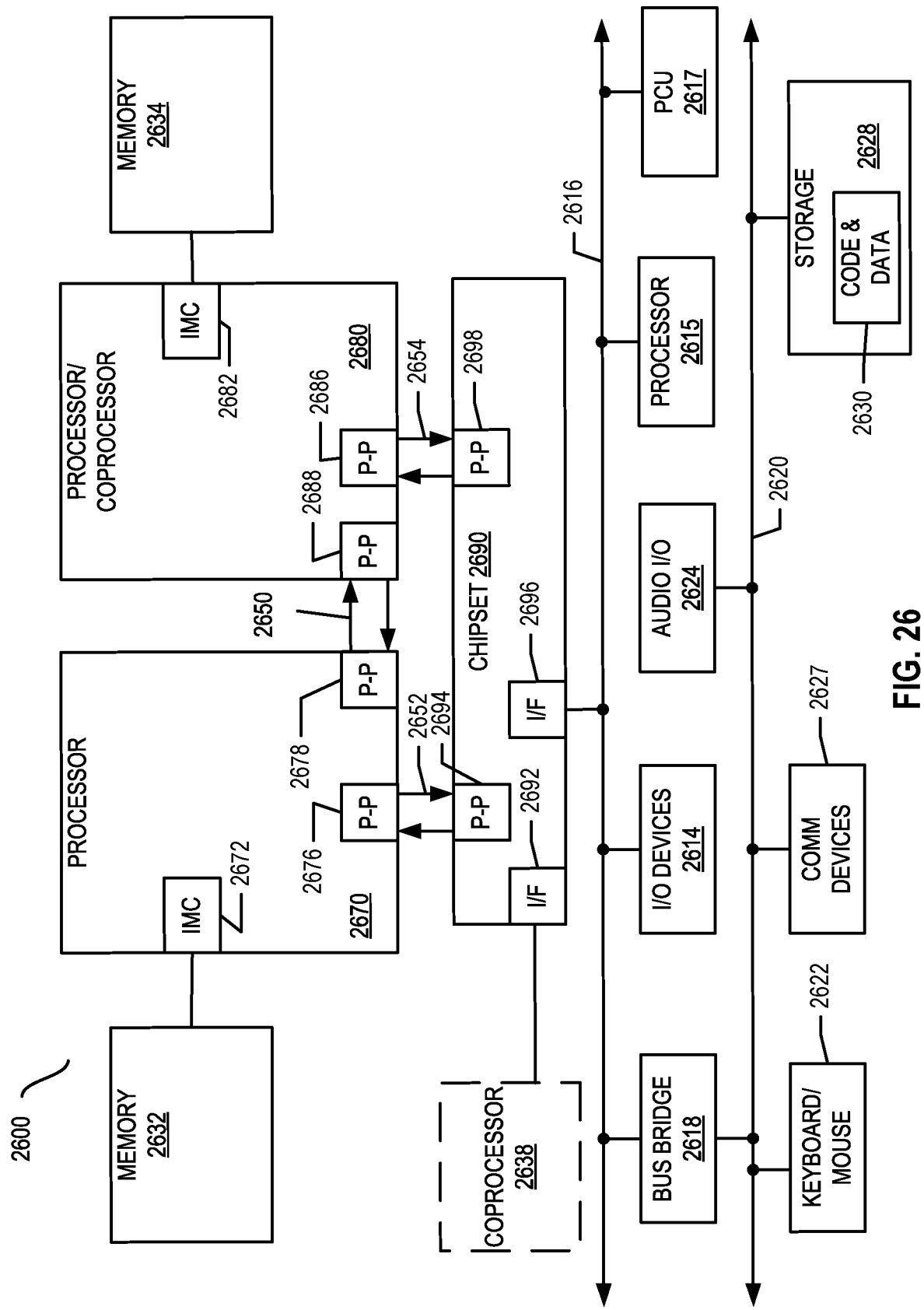
FIG. 26 illustrates embodiments of an exemplary system.

FIG. 26 illustrates embodiments of an exemplary system. Multiprocessor system 2600 is a point-to-point interconnect system and includes a plurality of processors including a first processor 2670 and a second processor 2680 coupled via a point-to-point interconnect 2650. In some embodiments, the first processor 2670 and the second processor 2680 are homogeneous. In some embodiments, first processor 2670 and the second processor 2680 are heterogenous.

Processors 2670 and 2680 are shown including integrated memory controller (IMC) units circuitry 2672 and 2682, respectively. Processor 2670 also includes as part of its interconnect controller units point-to-point (P-P) interfaces 2676 and 2678; similarly, second processor 2680 includes P-P interfaces 2686 and 2688. Processors 2670, 2680 may exchange information via the point-to-point (P-P) interconnect 2650 using P-P interface circuits 2678, 2688. IMCs 2672 and 2682 couple the processors 2670, 2680 to respective memories, namely a memory 2632 and a memory 2634, which may be portions of main memory locally attached to the respective processors.

Processors 2670, 2680 may each exchange information with a chipset 2690 via individual P-P interconnects 2652, 2654 using point to point interface circuits 2676, 2694, 2686, 2698. Chipset 2690 may optionally exchange information with a coprocessor 2638 via a high-performance interface 2692. In some embodiments, the coprocessor 2638 is a special-purpose processor, such as, for example, a high-throughput MIC processor, a network or communication processor, compression engine, graphics processor, GPGPU, embedded processor, or the like.

A shared cache (not shown) may be included in either processor 2670, 2680 or outside of both processors, yet connected with the processors via P-P interconnect, such that either or both processors' local cache information may be stored in the shared cache if a processor is placed into a low power mode.

Chipset 2690 may be coupled to a first interconnect 2616 via an interface 2696. In some embodiments, first interconnect 2616 may be a Peripheral Component Interconnect (PCI) interconnect, or an interconnect such as a PCI Express interconnect or another I/O interconnect. In some embodiments, one of the interconnects couples to a power control unit (PCU) 2617, which may include circuitry, software, and/or firmware to perform power management operations with regard to the processors 2670, 2680 and/or co-processor 2638. PCU 2617 provides control information to a voltage regulator to cause the voltage regulator to generate the appropriate regulated voltage. PCU 2617 also provides control information to control the operating voltage generated. In various embodiments, PCU 2617 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 2617 is illustrated as being present as logic separate from the processor 2670 and/or processor 2680. In other cases, PCU 2617 may execute on a given one or more of cores (not shown) of processor 2670 or 2680. In some cases, PCU 2617 may be implemented as a microcontroller (dedicated or general-purpose) or other control logic configured to execute its own dedicated power management code, sometimes referred to as P-code. In yet other embodiments, power management operations to be performed by PCU 2617 may be implemented externally to a processor, such as by way of a separate power management integrated circuit (PMIC) or another component external to the processor. In yet other embodiments, power management operations to be performed by PCU 2617 may be implemented within BIOS or other system software.

Various I/O devices 2614 may be coupled to first interconnect 2616, along with an interconnect (bus) bridge 2618 which couples first interconnect 2616 to a second interconnect 2620. In some embodiments, one or more additional processor(s) 2615, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 2616. In some embodiments, second interconnect 2620 may be a low pin count (LPC) interconnect. Various devices may be coupled to second interconnect 2620 including, for example, a keyboard and/or mouse 2622, communication devices 2627 and a storage unit circuitry 2628. Storage unit circuitry 2628 may be a disk drive or other mass storage device which may include instructions/code and data 2630, in some embodiments. Further, an audio I/O 2624 may be coupled to second interconnect 2620. Note that other architectures than the point-to-point architecture described above are possible. For example, instead of the point-to-point architecture, a system such as multiprocessor system 2600 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 27:
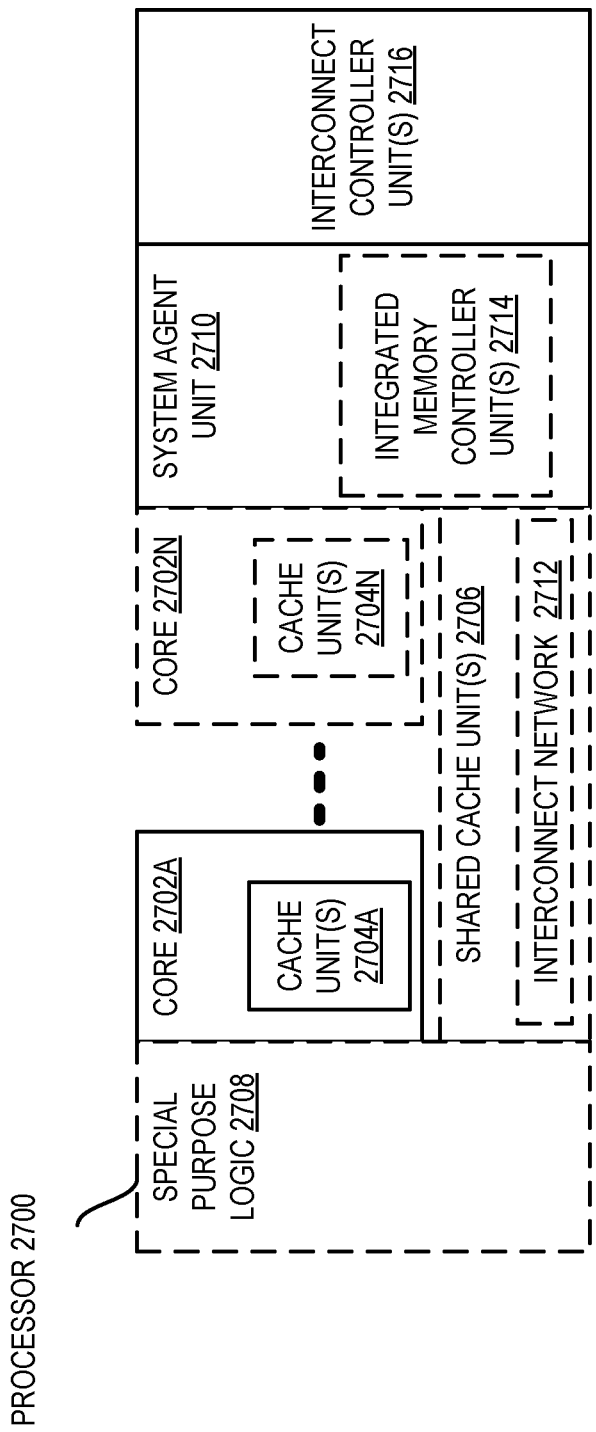
FIG. 27 illustrates a block diagram of embodiments of a processor 2700 that may have more than one core, may have an integrated memory controller, and may have integrated graphics.

FIG. 27 illustrates a block diagram of embodiments of a processor 2700 that may have more than one core, may have an integrated memory controller, and may have integrated graphics. The solid lined boxes illustrate a processor 2700 with a single core 2702A, a system agent 2710, a set of one or more interconnect controller units circuitry 2716, while the optional addition of the dashed lined boxes illustrates an alternative processor 2700 with multiple cores 2702(A)-(N), a set of one or more integrated memory controller unit(s) circuitry 2714 in the system agent unit circuitry 2710, and special purpose logic 2708, as well as a set of one or more interconnect controller units circuitry 2716. Note that the processor 2700 may be one of the processors 2670 or 2680, or co-processor 2638 or 2615 of FIG. 26.

Thus, different implementations of the processor 2700 may include: 1) a CPU with the special purpose logic 2708 being integrated graphics and/or scientific (throughput) logic (which may include one or more cores, not shown), and the cores 2702(A)-(N) being one or more general purpose cores (e.g., general purpose in-order cores, general purpose out-of-order cores, or a combination of the two); 2) a coprocessor with the cores 2702(A)-(N) being a large number of special purpose cores intended primarily for graphics and/or scientific (throughput); and 3) a coprocessor with the cores 2702(A)-(N) being a large number of general purpose in-order cores. Thus, the processor 2700 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 2700 may be a part of and/or may be implemented on one or more substrates using any of a number of process technologies, such as, for example, BiCMOS, CMOS, or NMOS.

A memory hierarchy includes one or more levels of cache unit(s) circuitry 2704(A)-(N) within the cores 2702(A)-(N), a set of one or more shared cache units circuitry 2706, and external memory (not shown) coupled to the set of integrated memory controller units circuitry 2714. The set of one or more shared cache units circuitry 2706 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 2712 interconnects the special purpose logic 2708 (e.g., integrated graphics logic), the set of shared cache units circuitry 2706, and the system agent unit circuitry 2710, alternative embodiments use any number of well-known techniques for interconnecting such units. In some embodiments, coherency is maintained between one or more of the shared cache units circuitry 2706 and cores 2702(A)-(N).

In some embodiments, one or more of the cores 2702(A)-(N) are capable of multithreading. The system agent unit circuitry 2710 includes those components coordinating and operating cores 2702(A)-(N). The system agent unit circuitry 2710 may include, for example, power control unit (PCU) circuitry and/or display unit circuitry (not shown). The PCU may be or may include logic and components needed for regulating the power state of the cores 2702(A)-(N) and/or the special purpose logic 2708 (e.g., integrated graphics logic). The display unit circuitry is for driving one or more externally connected displays.

The cores 2702(A)-(N) may be homogenous or heterogeneous in terms of architecture instruction set; that is, two or more of the cores 2702(A)-(N) may be capable of executing the same instruction set, while other cores may be capable of executing only a subset of that instruction set or a different instruction set.

Exemplary Core Architectures

In-Order and Out-of-Order Core Block Diagram

Figure 28A:
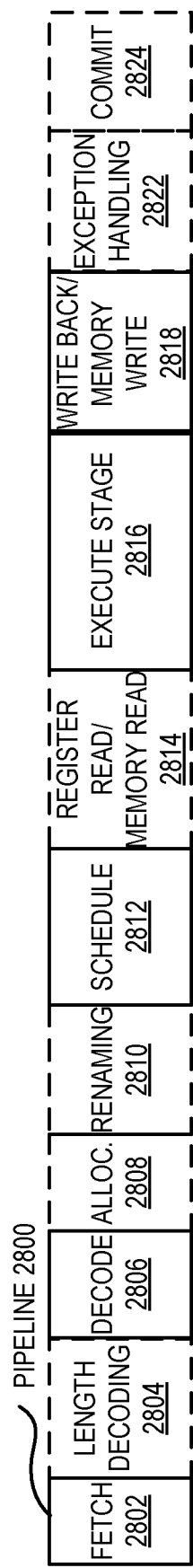
FIG. 28(A) is a block diagram illustrating both an exemplary in-order pipeline and an exemplary register renaming, out-of-order issue/execution pipeline according to embodiments of the invention.
Figure 28B:
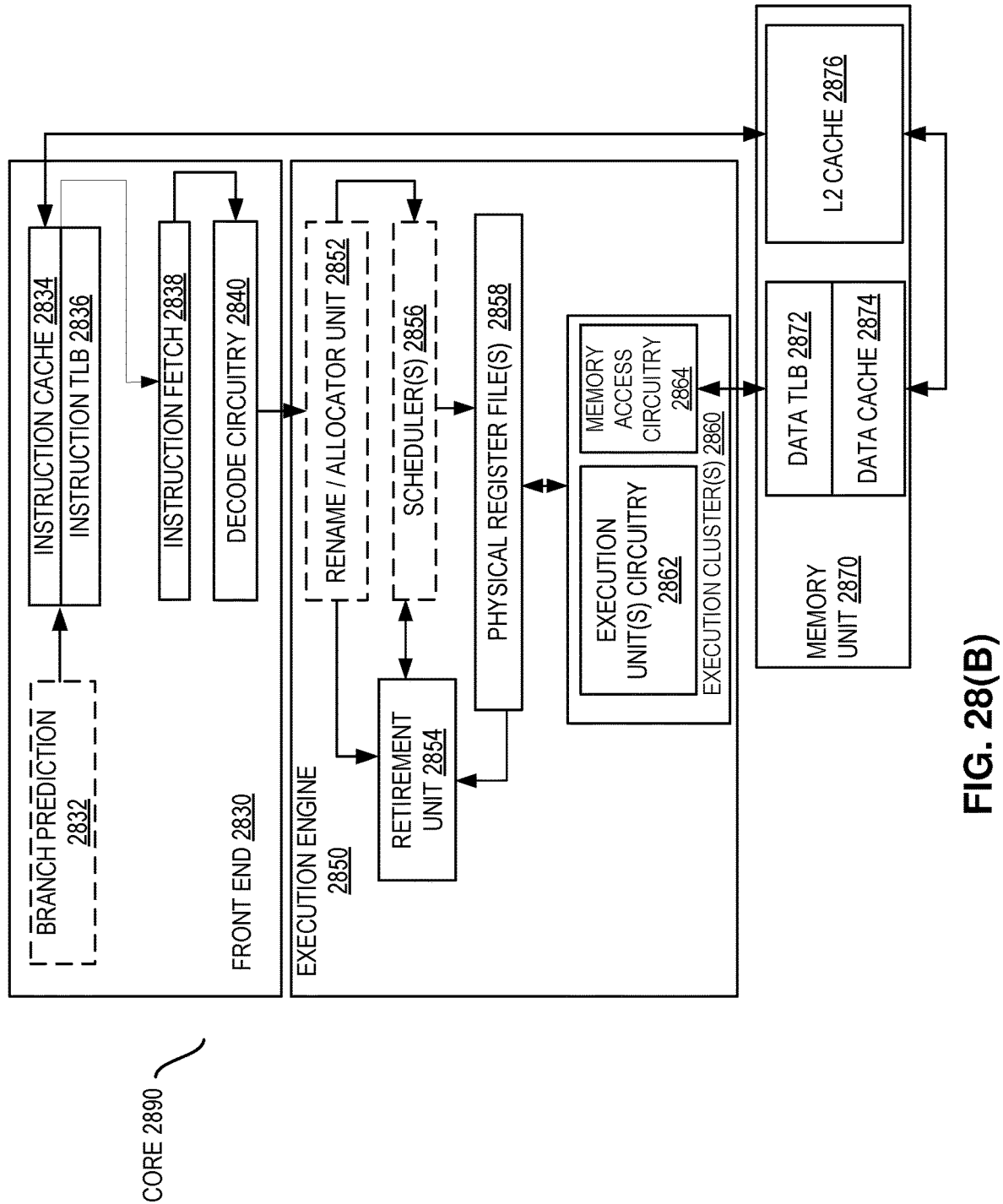
FIG. 28(B) is a block diagram illustrating both an exemplary embodiment of an in-order architecture core and an exemplary register renaming, out-of-order issue/execution architecture core to be included in a processor according to embodiments of the invention.

FIG. 28(A) is a block diagram illustrating both an exemplary in-order pipeline and an exemplary register renaming, out-of-order issue/execution pipeline according to embodiments of the invention. FIG. 28(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 28(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 28(A), a processor pipeline 2800 includes a fetch stage 2802, an optional length decode stage 2804, a decode stage 2806, an optional allocation stage 2808, an optional renaming stage 2810, a scheduling (also known as a dispatch or issue) stage 2812, an optional register read/memory read stage 2814, an execute stage 2816, a write back/memory write stage 2818, an optional exception handling stage 2822, and an optional commit stage 2824. One or more operations can be performed in each of these processor pipeline stages. For example, during the fetch stage 2802, one or more instructions are fetched from instruction memory, during the decode stage 2806, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 2806 and the register read/memory read stage 2814 may be combined into one pipeline stage. In one embodiment, during the execute stage 2816, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 2800 as follows: 1) the instruction fetch 2838 performs the fetch and length decoding stages 2802 and 2804; 2) the decode unit circuitry 2840 performs the decode stage 2806; 3) the rename/allocator unit circuitry 2852 performs the allocation stage 2808 and renaming stage 2810; 4) the scheduler unit(s) circuitry 2856 performs the schedule stage 2812; 5) the physical register file(s) unit(s) circuitry 2858 and the memory unit circuitry 2870 perform the register read/memory read stage 2814; the execution cluster 2860 perform the execute stage 2816; 6) the memory unit circuitry 2870 and the physical register file(s) unit(s) circuitry 2858 perform the write back/memory write stage 2818; 7) various units (unit circuitry) may be involved in the exception handling stage 2822; and 8) the retirement unit circuitry 2854 and the physical register file(s) unit(s) circuitry 2858 perform the commit stage 2824.

FIG. 28(B) shows processor core 2890 including front-end unit circuitry 2830 coupled to an execution engine unit circuitry 2850, and both are coupled to a memory unit circuitry 2870. The core 2890 may be a reduced instruction set computing (RISC) core, a complex instruction set computing (CISC) core, a very long instruction word (VLIW) core, or a hybrid or alternative core type. As yet another option, the core 2890 may be a special-purpose core, such as, for example, a network or communication core, compression engine, coprocessor core, general purpose computing graphics processing unit (GPGPU) core, graphics core, or the like.

The front-end unit circuitry 2830 may include branch prediction unit circuitry 2832 coupled to an instruction cache unit circuitry 2834, which is coupled to an instruction translation lookaside buffer (TLB) 2836, which is coupled to instruction fetch unit circuitry 2838, which is coupled to decode unit circuitry 2840. In one embodiment, the instruction cache unit circuitry 2834 is included in the memory unit circuitry 2870 rather than the front-end unit circuitry 2830. The decode unit circuitry 2840 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 2840 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 2840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2890 includes a microcode ROM (not shown) or other medium that stores microcode for certain macroinstructions (e.g., in decode unit circuitry 2840 or otherwise within the front-end unit circuitry 2830). In one embodiment, the decode unit circuitry 2840 includes a micro-operation (micro-op) or operation cache (not shown) to hold/cache decoded operations, micro-tags, or micro-operations generated during the decode or other stages of the processor pipeline 2800. The decode unit circuitry 2840 may be coupled to rename/allocator unit circuitry 2852 in the execution engine unit circuitry 2850.

The execution engine circuitry 2850 includes the rename/allocator unit circuitry 2852 coupled to a retirement unit circuitry 2854 and a set of one or more scheduler(s) circuitry 2856. The scheduler(s) circuitry 2856 represents any number of different schedulers, including reservations stations, central instruction window, etc. In some embodiments, the scheduler(s) circuitry 2856 can include arithmetic logic unit (ALU) scheduler/scheduling circuitry, ALU queues, arithmetic generation unit (AGU) scheduler/scheduling circuitry, AGU queues, etc. The scheduler(s) circuitry 2856 is coupled to the physical register file(s) circuitry 2858. Each of the physical register file(s) circuitry 2858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 2858 includes vector registers unit circuitry, writemask registers unit circuitry, and scalar register unit circuitry. These register units may provide architectural vector registers, vector mask registers, general-purpose registers, etc. The physical register file(s) unit(s) circuitry 2858 is overlapped by the retirement unit circuitry 2854 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 2854 and the physical register file(s) circuitry 2858 are coupled to the execution cluster(s) 2860. The execution cluster(s) 2860 includes a set of one or more execution units circuitry 2862 and a set of one or more memory access circuitry 2864. The execution units circuitry 2862 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 2856, physical register file(s) unit(s) circuitry 2858, and execution cluster(s) 2860 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 2864). It should also be understood that where separate pipelines are used, one or more of these pipelines may be out-of-order issue/execution and the rest in-order.

In some embodiments, the execution engine unit circuitry 2850 may perform load store unit (LSU) address/data pipelining to an Advanced Microcontroller Bus (AHB) interface (not shown), and address phase and writeback, data phase load, store, and branches.

The set of memory access circuitry 2864 is coupled to the memory unit circuitry 2870, which includes data TLB unit circuitry 2872 coupled to a data cache circuitry 2874 coupled to a level 2 (L2) cache circuitry 2876. In one exemplary embodiment, the memory access units circuitry 2864 may include a load unit circuitry, a store address unit circuit, and a store data unit circuitry, each of which is coupled to the data TLB circuitry 2872 in the memory unit circuitry 2870. The instruction cache circuitry 2834 is further coupled to a level 2 (L2) cache unit circuitry 2876 in the memory unit circuitry 2870. In one embodiment, the instruction cache 2834 and the data cache 2874 are combined into a single instruction and data cache (not shown) in L2 cache unit circuitry 2876, a level 3 (L3) cache unit circuitry (not shown), and/or main memory. The L2 cache unit circuitry 2876 is coupled to one or more other levels of cache and eventually to a main memory.

The core 2890 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 2890 includes logic to support a packed data instruction set extension (e.g., AVX1, AVX2), thereby allowing the operations used by many multimedia applications to be performed using packed data.

Exemplary Execution Unit(s) Circuitry

Figure 29:
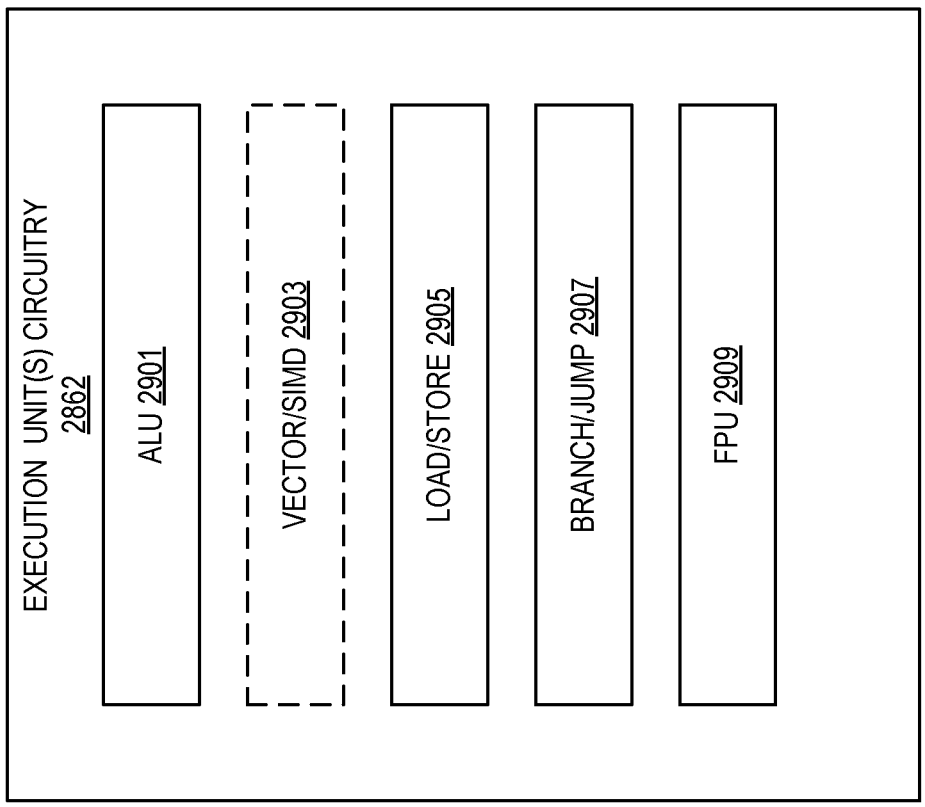
FIG. 29 illustrates embodiments of execution unit(s) circuitry, such as execution unit(s) circuitry 2862 of FIG. 28(B).

FIG. 29 illustrates embodiments of execution unit(s) circuitry, such as execution unit(s) circuitry 2862 of FIG. 28(B). As illustrated, execution unit(s) circuitry 2862 may include one or more ALU circuits 2901, vector/SIMD unit circuits 2903, load/store unit circuits 2905, and/or branch/jump unit circuits 2907. ALU circuits 2901 perform integer arithmetic and/or Boolean operations. Vector/SIMD unit circuits 2903 perform vector/SIMD operations on packed data (such as SIMD/vector registers). Load/store unit circuits 2905 execute load and store instructions to load data from memory into registers or store from registers to memory. Load/store unit circuits 2905 may also generate addresses. Branch/jump unit circuits 2907 cause a branch or jump to a memory address depending on the instruction. Floating-point unit (FPU) circuits 2909 perform floating-point arithmetic. The width of the execution unit(s) circuitry 2862 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 30:
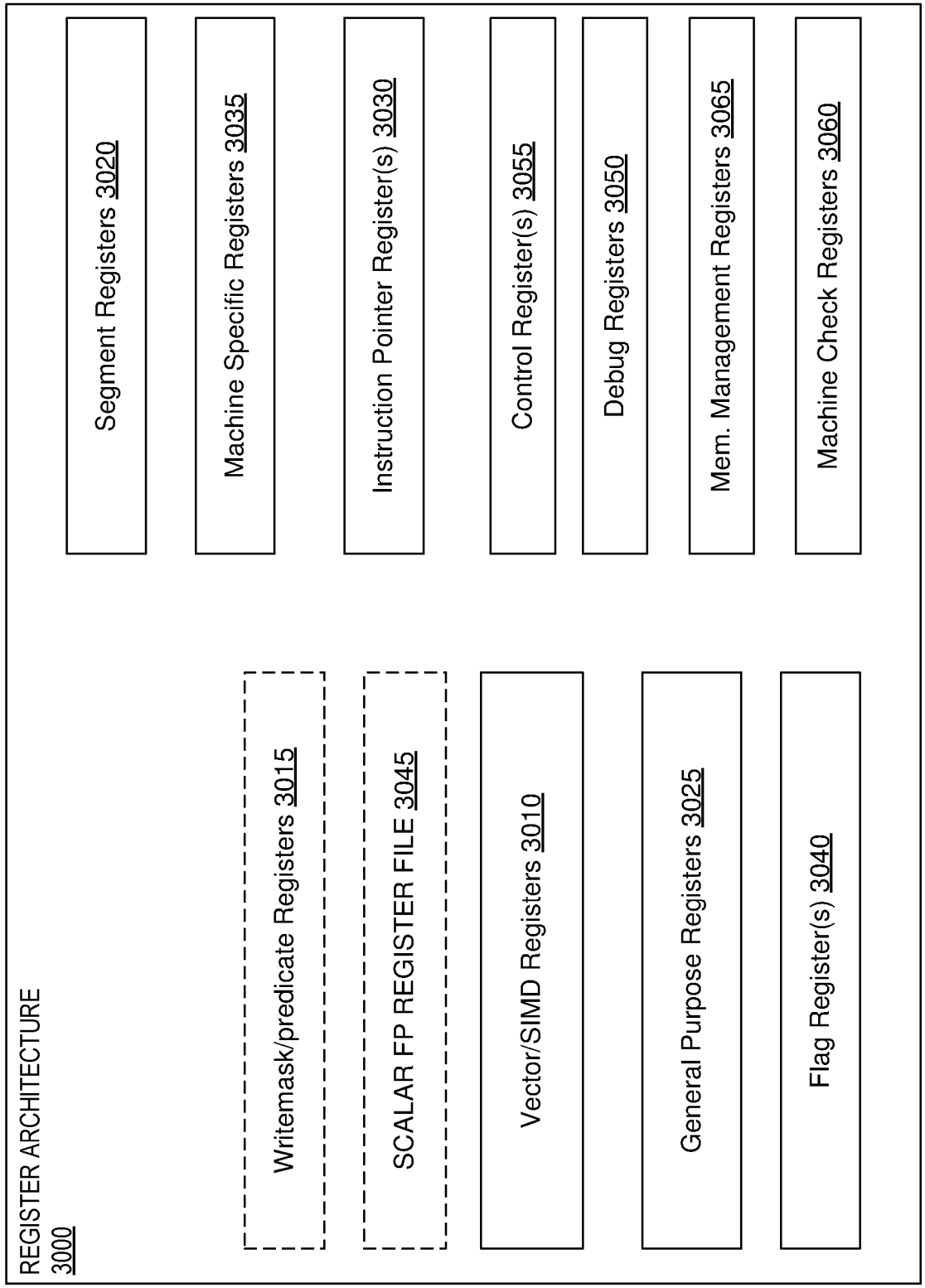
FIG. 30 is a block diagram of a register architecture 3000 according to some embodiments.

FIG. 30 is a block diagram of a register architecture 3000 according to some embodiments. As illustrated, there are vector/SIMD registers 3010 that vary from 128-bit to 1,024 bits width. In some embodiments, the vector/SIMD registers 3010 are physically 512-bits and, depending upon the mapping, only some of the lower bits are used. For example, in some embodiments, the vector/SIMD registers 3010 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 3000 includes writemask/predicate registers 3015. For example, in some embodiments, there are 8 writemask/predicate registers (sometimes called k0 through k7) that are each 16-bit, 32-bit, 64-bit, or 128-bit in size. Writemask/predicate registers 3015 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 3015 corresponds to a data element position of the destination. In other embodiments, the writemask/predicate registers 3015 are scalable and consists of a set number of enable bits for a given vector element (e.g., 8 enable bits per 64-bit vector element).

The register architecture 3000 includes a plurality of general-purpose registers 3025. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 3000 includes scalar floating-point register 3045 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 3040 (e.g., EFLAGS, RFLAGS, etc.) store status and control information for arithmetic, compare, and system operations. For example, the one or more flag registers 3040 may store condition code information such as carry, parity, auxiliary carry, zero, sign, and overflow. In some embodiments, the one or more flag registers 3040 are called program status and control registers.

Segment registers 3020 contain segment points for use in accessing memory. In some embodiments, these registers are referenced by the names CS, DS, SS, ES, FS, and GS.

Machine specific registers (MSRs) 3035 control and report on processor performance. Most MSRs 3035 handle system-related functions and are not accessible to an application program. Machine check registers 3060 consist of control, status, and error reporting MSRs that are used to detect and report on hardware errors.

One or more instruction pointer register(s) 3030 store an instruction pointer value. Control register(s) 3055 (e.g., CR0-CR4) determine the operating mode of a processor (e.g., processor 2670, 2680, 2638, 2615, and/or 2700) and the characteristics of a currently executing task. Debug registers 3050 control and allow for the monitoring of a processor or core's debugging operations.

Memory management registers 3065 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 31:
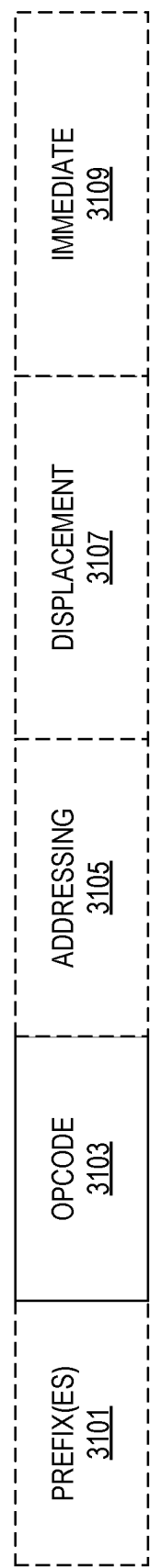
FIG. 31 illustrates embodiments of an instruction format.

FIG. 31 illustrates embodiments of an instruction format. As illustrated, an instruction may include multiple components including, but not limited to, one or more fields for: one or more prefixes 3101, an opcode 3103, addressing information 3105 (e.g., register identifiers, memory addressing information, etc.), a displacement value 3107, and/or an immediate 3109. Note that some instructions utilize some or all of the fields of the format whereas others may only use the field for the opcode 3103. In some embodiments, the order illustrated is the order in which these fields are to be encoded, however, it should be appreciated that in other embodiments these fields may be encoded in a different order, combined, etc.

The prefix(es) field(s) 3101, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 3103 is used to at least partially define the operation to be performed upon a decoding of the instruction. In some embodiments, a primary opcode encoded in the opcode field 3103 is 1, 2, or 3 bytes in length. In other embodiments, a primary opcode can be a different length. An additional 3-bit opcode field is sometimes encoded in another field.

Figure 32:
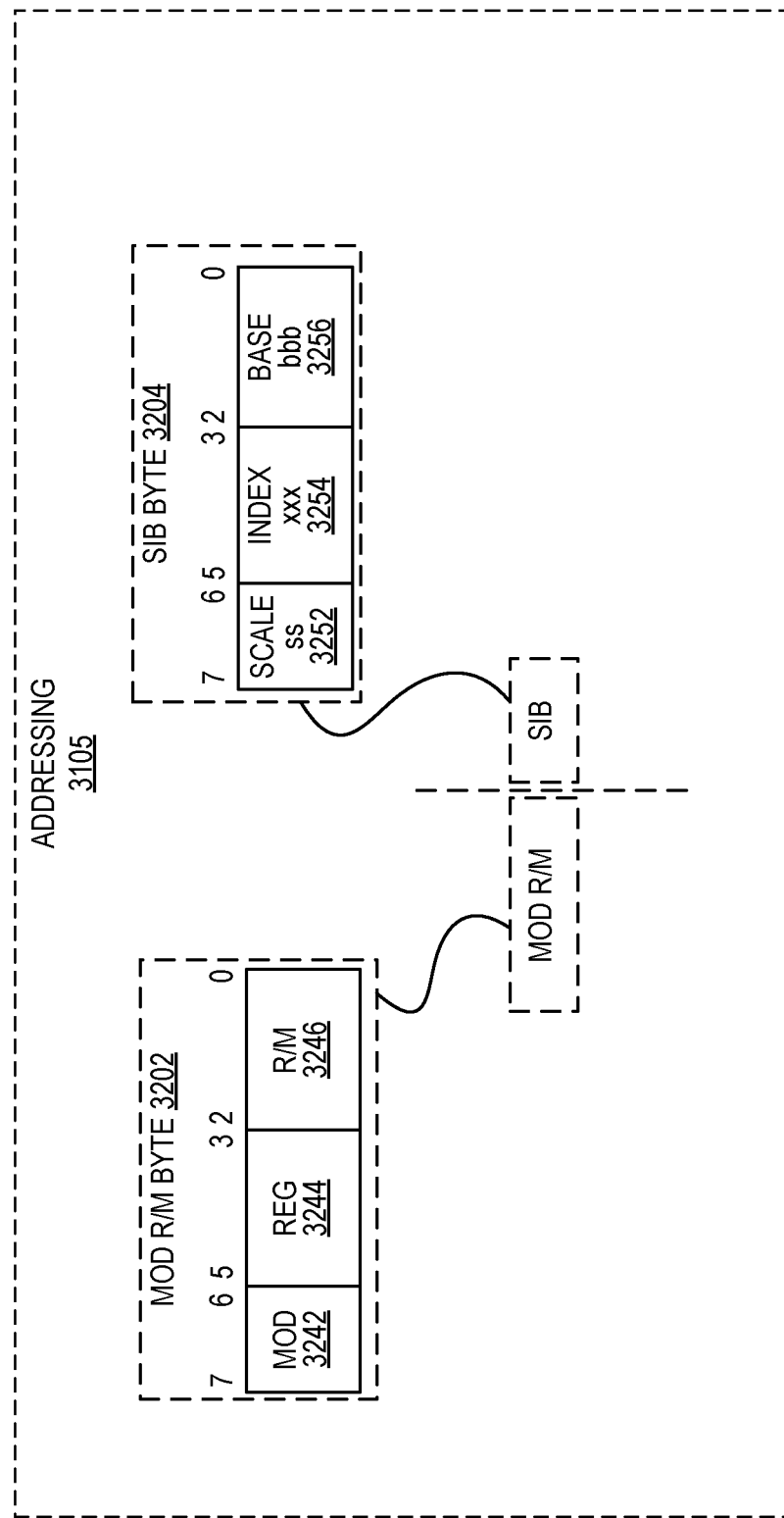
FIG. 32 illustrates embodiments of the addressing field 3105.

The addressing field 3105 is used to address one or more operands of the instruction, such as a location in memory or one or more registers. FIG. 32 illustrates embodiments of the addressing field 3105. In this illustration, an optional ModR/M byte 3202 and an optional Scale, Index, Base (SIB) byte 3204 are shown. The ModR/M byte 3202 and the SIB byte 3204 are used to encode up to two operands of an instruction, each of which is a direct register or effective memory address. Note that each of these fields are optional in that not all instructions include one or more of these fields. The MOD R/M byte 3202 includes a MOD field 3242, a register field 3244, and R/M field 3246.

The content of the MOD field 3242 distinguishes between memory access and non-memory access modes. In some embodiments, when the MOD field 3242 has a value of b11, a register-direct addressing mode is utilized, and otherwise register-indirect addressing is used.

The register field 3244 may encode either the destination register operand or a source register operand, or may encode an opcode extension and not be used to encode any instruction operand. The content of register index field 3244, directly or through address generation, specifies the locations of a source or destination operand (either in a register or in memory). In some embodiments, the register field 3244 is supplemented with an additional bit from a prefix (e.g., prefix 3101) to allow for greater addressing.

The R/M field 3246 may be used to encode an instruction operand that references a memory address, or may be used to encode either the destination register operand or a source register operand. Note the R/M field 3246 may be combined with the MOD field 3242 to dictate an addressing mode in some embodiments.

The SIB byte 3204 includes a scale field 3252, an index field 3254, and a base field 3256 to be used in the generation of an address. The scale field 3252 indicates scaling factor. The index field 3254 specifies an index register to use. In some embodiments, the index field 3254 is supplemented with an additional bit from a prefix (e.g., prefix 3101) to allow for greater addressing. The base field 3256 specifies a base register to use. In some embodiments, the base field 3256 is supplemented with an additional bit from a prefix (e.g., prefix 3101) to allow for greater addressing. In practice, the content of the scale field 3252 allows for the scaling of the content of the index field 3254 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 3107 provides this value. Additionally, in some embodiments, a displacement factor usage is encoded in the MOD field of the addressing field 3105 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 3107.

In some embodiments, an immediate field 3109 specifies an immediate for the instruction. An immediate may be encoded as a 1-byte value, a 2-byte value, a 4-byte value, etc.

FIG. 33 illustrates embodiments of a first prefix 3101(A). In some embodiments, the first prefix 3101(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 3101(A) may specify up to three registers using 3-bit fields depending on the format: 1) using the reg field 3244 and the R/M field 3246 of the Mod R/M byte 3202; 2) using the Mod R/M byte 3202 with the SIB byte 3204 including using the reg field 3244 and the base field 3256 and index field 3254; or 3) using the register field of an opcode.

In the first prefix 3101(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 3244 and MOD R/M R/M field 3246 alone can each only address 8 registers.

In the first prefix 3101(A), bit position 2 (R) may an extension of the MOD R/M reg field 3244 and may be used to modify the ModR/M reg field 3244 when that field encodes a general purpose register, a 64-bit packed data register (e.g., a SSE register), or a control or debug register. R is ignored when Mod R/M byte 3202 specifies other registers or defines an extended opcode.

Bit position 1 (X) X bit may modify the SIB byte index field 3254.

Bit position B (B) B may modify the base in the Mod R/M R/M field 3246 or the SIB byte base field 3256; or it may modify the opcode register field used for accessing general purpose registers (e.g., general purpose registers 3025).

FIGS. 34(A)-(D) illustrate embodiments of how the R, X, and B fields of the first prefix 3101(A) are used. FIG. 34(A) illustrates R and B from the first prefix 3101(A) being used to extend the reg field 3244 and R/M field 3246 of the MOD R/M byte 3202 when the SIB byte 3204 is not used for memory addressing. FIG. 34(B) illustrates R and B from the first prefix 3101(A) being used to extend the reg field 3244 and R/M field 3246 of the MOD R/M byte 3202 when the SIB byte 3204 is not used (register-register addressing). FIG. 34(C) illustrates R, X, and B from the first prefix 3101(A) being used to extend the reg field 3244 of the MOD RIM byte 3202 and the index field 3254 and base field 3256 when the SIB byte 32 04 being used for memory addressing. FIG. 34(D) illustrates B from the first prefix 3101(A) being used to extend the reg field 3244 of the MOD R/M byte 3202 when a register is encoded in the opcode 3103.

Figure 35A:
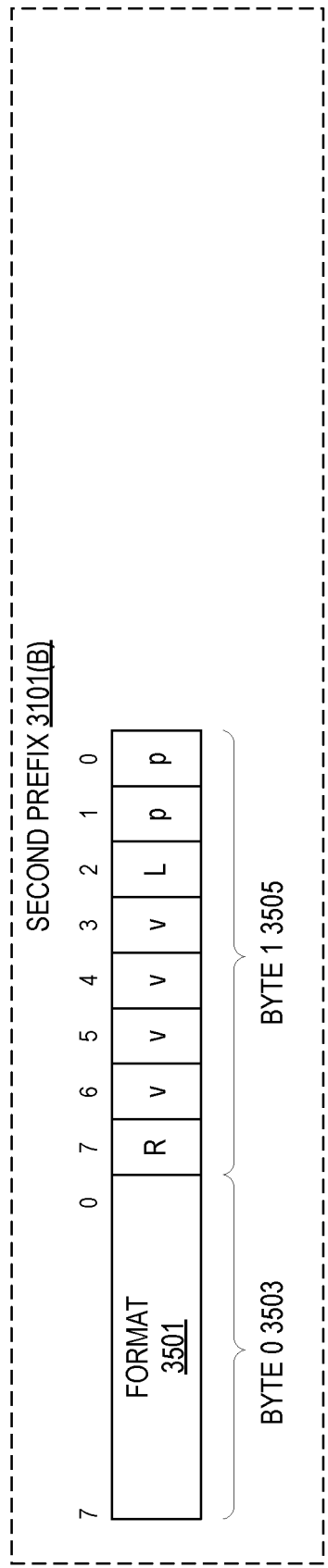
FIGS. 35(A)-(B) illustrate embodiments of a second prefix 3101(B).
Figure 35B:
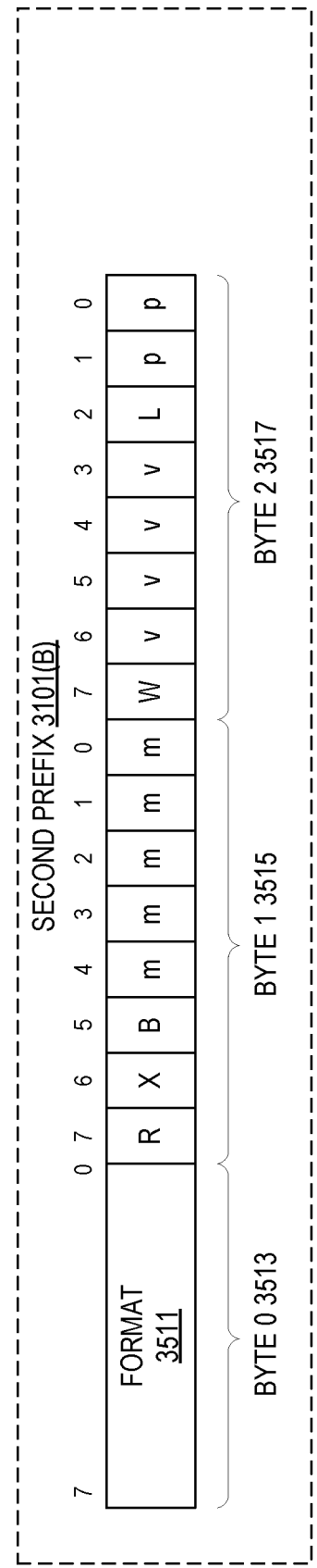

FIGS. 35(A)-(B) illustrate embodiments of a second prefix 3101(B). In some embodiments, the second prefix 3101(B) is an embodiment of a VEX prefix. The second prefix 3101(B) encoding allows instructions to have more than two operands, and allows SIMD vector registers (e.g., vector/SIMD registers 3010) to be longer than 64-bits (e.g., 128-bit and 256-bit). The use of the second prefix 3101(B) provides for three-operand (or more) syntax. For example, previous two-operand instructions performed operations such as A=A+B, which overwrites a source operand. The use of the second prefix 3101(B) enables operands to perform nondestructive operations such as A=B+C.

In some embodiments, the second prefix 3101(B) comes in two forms—a two-byte form and a three-byte form. The two-byte second prefix 3101(B) is used mainly for 128-bit, scalar, and some 256-bit instructions; while the three-byte second prefix 3101(B) provides a compact replacement of the first prefix 3101(A) and 3-byte opcode instructions.

FIG. 35(A) illustrates embodiments of a two-byte form of the second prefix 3101(B). In one example, a format field 3501 (byte 0 3503) contains the value C5H. In one example, byte 1 3505 includes a "R" value in bit[7]. This value is the complement of the same value of the first prefix 3101(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3246 to encode the instruction operand that references a memory address or encode either the destination register operand or a source register operand.

Instructions that use this prefix may use the Mod R/M reg field 3244 to encode either the destination register operand or a source register operand, be treated as an opcode extension and not used to encode any instruction operand.

For instruction syntax that support four operands, vvvv, the Mod R/M R/M field 3246 and the Mod R/M reg field 3244 encode three of the four operands. Bits[7:4] of the immediate 3109 are then used to encode the third source register operand.

FIG. 35(B) illustrates embodiments of a three-byte form of the second prefix 3101(B). in one example, a format field 3511 (byte 0 3513) contains the value C4H. Byte 1 3515 includes in bits[7:5] "R," "X," and "B" which are the complements of the same values of the first prefix 3101(A). Bits[4:0] of byte 1 3515 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 3517 is used similar to W of the first prefix 3101(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3246 to encode the instruction operand that references a memory address or encode either the destination register operand or a source register operand.

Instructions that use this prefix may use the Mod R/M reg field 3244 to encode either the destination register operand or a source register operand, be treated as an opcode extension and not used to encode any instruction operand.

For instruction syntax that support four operands, vvvv, the Mod R/M R/M field 3246, and the Mod R/M reg field 3244 encode three of the four operands. Bits[7:4] of the immediate 3109 are then used to encode the third source register operand.

Figure 36:
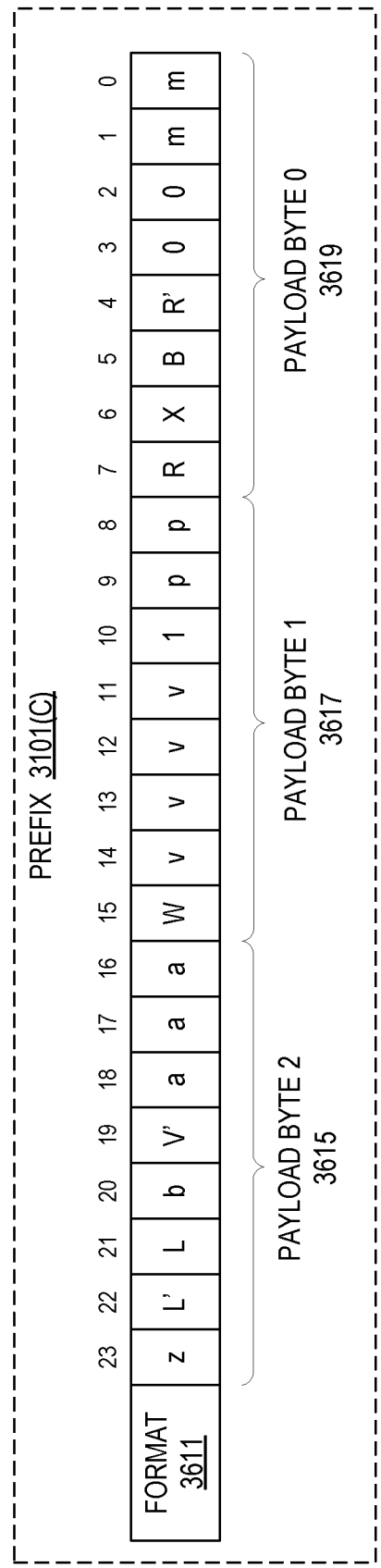
FIG. 36 illustrates embodiments of a third prefix 3101(C).

FIG. 36 illustrates embodiments of a third prefix 3101(C). In some embodiments, the first prefix 3101(A) is an embodiment of an EVEX prefix. The third prefix 3101(C) is a four-byte prefix.

The third prefix 3101(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 30) or predication utilize this prefix. Opmask register allow for conditional processing or selection control. Opmask instructions, whose source/destination operands are opmask registers and treat the content of an opmask register as a single value, are encoded using the second prefix 3101(B).

The third prefix 3101(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 3101(C) is a format field 3611 that has a value, in one example, of 62H. Subsequent bytes are referred to as payload bytes 3615-3619 and collectively form a 24-bit value of P[23:0] providing specific capability in the form of one or more fields (detailed herein).

In some embodiments, P[1:0] of payload byte 3619 are identical to the low two mmmmm bits. P[3:2] are reserved in some embodiments. Bit P[4] (R') allows access to the high 16 vector register set when combined with P[7] and the ModR/M reg field 3244. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 3244 and ModR/M R/M field 3246. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 3101(A) and second prefix 3111(B) and may serve as an opcode extension bit or operand size promotion.

P[18:16] specify the index of a register in the opmask (writemask) registers (e.g., writemask/predicate registers 3015). In one embodiment of the invention, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 3101(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 37:
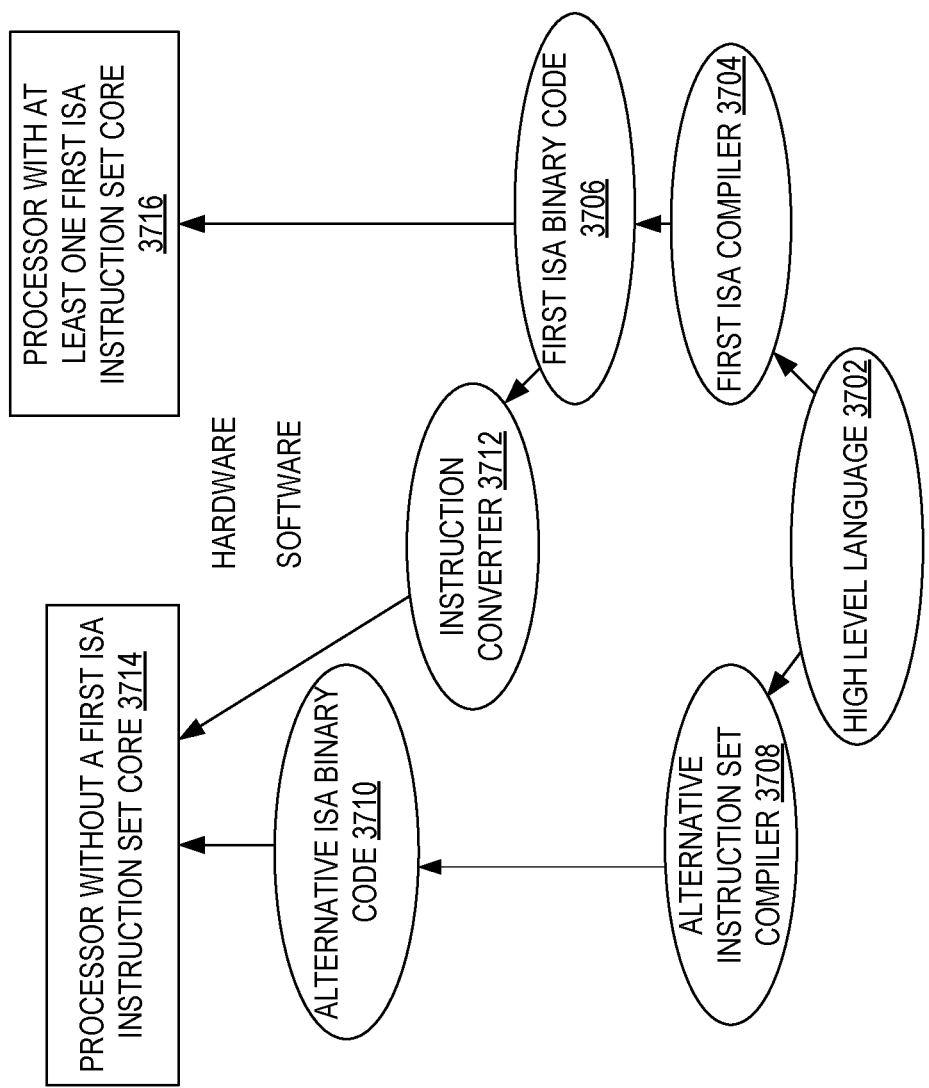
FIG. 37 illustrates a block diagram contrasting the use of a software instruction converter to convert binary instructions in a source instruction set to binary instructions in a target instruction set according to embodiments of the invention.

FIG. 37 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 37 shows a program in a high-level language 3702 may be compiled using a first ISA compiler 3704 to generate first ISA binary code 3706 that may be natively executed by a processor with at least one first instruction set core 3716. The processor with at least one first ISA instruction set core 3716 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 3704 represents a compiler that is operable to generate first ISA binary code 3706 (e.g., object code) that can, with or without additional linkage processing, be executed on the processor with at least one first ISA instruction set core 3716. Similarly, FIG. 37 shows the program in the high-level language 3702 may be compiled using an alternative instruction set compiler 3708 to generate alternative instruction set binary code 3710 that may be natively executed by a processor without a first ISA instruction set core 3714. The instruction converter 3712 is used to convert the first ISA binary code 3706 into code that may be natively executed by the processor without a first ISA instruction set core 3714. This converted code is not likely to be the same as the alternative instruction set binary code 3710 because an instruction converter capable of this is difficult to make; however, the converted code will accomplish the general operation and be made up of instructions from the alternative instruction set. Thus, the instruction converter 3712 represents software, firmware, hardware, or a combination thereof that, through emulation, simulation or any other process, allows a processor or other electronic device that does not have a first ISA instruction set processor or core to execute the first ISA binary code 3706.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary Embodiments

1. A method comprising:
  decoding a single instruction, the instruction having one or more fields to specify an opcode, one or more fields to specify a location of a first source operand, one or more fields to specify a location of a second source operand, one or more fields to specify a location of a destination operand, and one or more fields to specify an index value to be used to index a row in the first source operand, wherein the opcode is to indicate execution circuitry is to downconvert data elements of the indexed row of the first source operand, interleave the downconverted elements with data elements of the second source operand, and store the interleaved elements in the destination operand; and
  executing the decoded instruction according to the opcode.
2. The method of example 1, wherein the downconverted data elements are to be downconverted from single precision floating-point to half-precision floating-point.
3. The method of example 1, wherein the downconverted data elements are to be downconverted from single precision floating-point to bfloat16 floating-point.
4. The method of any of examples 1-3, where the identified first source operand is a matrix operand.
5. The method of example 4, wherein the matrix operand comprises an overlay of a plurality of physical registers.
6. The method of any of examples 1-5, wherein the index value is specified by an immediate.
7. The method of any of examples 1-5, wherein the index value is specified by a value stored in an identified register.
8. A method comprising:
  decoding circuitry to or more fields to specify a location of a source/destination operand, one or more fields to specify a location of a source operand, and one or more fields to specify an index value to be used to index a row in the source/destination operand, wherein the opcode is to indicate execution circuitry is to downconvert data elements of the indexed row of the source/destination operand and interleave the downconverted elements with data elements of the source/destination; and
  executing the decoded instruction according to the opcode.
9. The method of example 8, wherein the downconverted data elements are to be downconverted from single precision floating-point to half-precision floating-point.
10. The method of example 8, wherein the downconverted data elements are to be downconverted from single precision floating-point to bfloat16 floating-point.
11. The method of any of examples 8-10, where the identified source/destination operand is a matrix operand.
12. The method of example 11, wherein the matrix operand comprises an overlay of a plurality of physical registers.
13. The apparatus of any of examples 8-12, wherein the index value is specified by an immediate.
14. The method of any of examples 8-12, wherein the index value is specified by a value stored in an identified register.
15. An apparatus to implement any of the methods of examples 1-14.
16. A system comprising:
  an apparatus to implement any of the methods of examples 1-14; and
  memory to store the single instruction.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:
1. An apparatus comprising:
  decoding circuitry to decode a single instruction, the instruction having one or more fields to specify an opcode, one or more fields to specify a location of a first source operand, one or more fields to specify a location of a second source operand, one or more fields to specify a location of a destination operand, and one or more fields to specify an index value to be used to index a row in the first source operand, wherein the opcode is to indicate execution circuitry is to downconvert data elements of the indexed row of the first source operand, interleave the downconverted elements with data elements of the second source operand, and store the interleaved elements in the destination operand; and
  execution circuitry to execute the decoded instruction according to the opcode.
2. The apparatus of claim 1, wherein the downconverted data elements are to be downconverted from single precision floating-point to half-precision floating-point.
3. The apparatus of claim 1, wherein the downconverted data elements are to be downconverted from single precision floating-point to bfloat16 floating-point.
4. The apparatus of claim 1, where the identified first source operand is a matrix operand.
5. The apparatus of claim 4, wherein the matrix operand comprises an overlay of a plurality of physical registers.
6. The apparatus of claim 1, wherein the index value is specified by an immediate.
7. The apparatus of claim 1, wherein the index value is specified by a value stored in an identified register.
8. An apparatus comprising:
  decoding circuitry to decode a single instruction, the instruction having one or more fields to specify an opcode, one or more fields to specify a location of a source/destination operand, one or more fields to specify a location of a source operand, and one or more fields to specify an index value to be used to index a row in the source/destination operand, wherein the opcode is to indicate execution circuitry is to downconvert data elements of the indexed row of the source/destination operand and interleave the downconverted elements with data elements of the source/destination; and
  execution circuitry to execute the decoded instruction according to the opcode.
9. The apparatus of claim 8, wherein the downconverted data elements are to be downconverted from single precision floating-point to half-precision floating-point.

10. The apparatus of claim 8, wherein the downconverted data elements are to be downconverted from single precision floating-point to bfloat16 floating-point.

11. The apparatus of claim 8, where the identified source/destination operand is a matrix operand.

12. The apparatus of claim 11, wherein the matrix operand comprises an overlay of a plurality of physical registers.

13. The apparatus of claim 8, wherein the index value is specified by an immediate.

14. The apparatus of claim 8, wherein the index value is specified by a value stored in an identified register.

* * * * *